United States Patent
Kudo et al.

(10) Patent No.: US 7,487,918 B2
(45) Date of Patent: Feb. 10, 2009

(54) INFORMATION ACQUISITION METHOD, INFORMATION PRESENTING METHOD, AND INFORMATION ACQUISITION SYSTEM

(75) Inventors: Takahiro Kudo, Osaka (JP); Jun Ozawa, Nara (JP); Satoshi Matsuura, Kyoto (JP)

(73) Assignee: Panasonic Corporation, Osaka (JP)

( * ) Notice: Subject to any disclaimer, the term of this patent is extended or adjusted under 35 U.S.C. 154(b) by 575 days.

(21) Appl. No.: 10/529,609

(22) PCT Filed: Oct. 10, 2003

(86) PCT No.: PCT/JP03/13092

§ 371 (c)(1),
(2), (4) Date: Mar. 30, 2005

(87) PCT Pub. No.: WO2004/034725

PCT Pub. Date: Apr. 22, 2004

(65) Prior Publication Data

US 2005/0251325 A1     Nov. 10, 2005

(30) Foreign Application Priority Data

Oct. 10, 2002  (JP)  .............................. 2002-297304
Apr. 11, 2003  (JP)  .............................. 2003-107595

(51) Int. Cl.
*G06K 7/10* (2006.01)
(52) U.S. Cl. .................................. 235/472.01; 235/384
(58) Field of Classification Search ............ 235/472.01, 235/472.02, 472.03, 384
See application file for complete search history.

(56) References Cited

U.S. PATENT DOCUMENTS

| 5,919,246 | A | 7/1999 | Waizmann et al. |
| 6,317,686 | B1 | 11/2001 | Ran |
| 6,256,579 | B1 | 7/2004 | Tanimoto |
| 2002/0120396 | A1 | 8/2002 | Boies et al. |
| 2002/0161517 | A1 | 10/2002 | Yano et al. |
| 2003/0225668 | A1 * | 12/2003 | Goto et al. .................... 705/37 |

FOREIGN PATENT DOCUMENTS

| EP | 1003018 | 5/2000 |
| JP | 11-006741 | 1/1999 |
| JP | 11-088937 | 3/1999 |
| JP | 11-149596 | 6/1999 |
| JP | 11-262048 | 9/1999 |
| JP | 2000-028376 A | 1/2000 |
| JP | 2000-293540 | 10/2000 |
| JP | 2000-293540 A | 10/2000 |
| JP | 2000-324246 | 11/2000 |
| JP | 2001-14297 A | 1/2001 |
| JP | 2002-213990 A | 7/2002 |
| JP | 2002-267487 A | 9/2002 |

* cited by examiner

*Primary Examiner*—Karl D. Frech
(74) *Attorney, Agent, or Firm*—Harness, Dickey & Pierce, P.L.C.

(57) ABSTRACT

In an information acquisition system such as a car navigation system, a history accumulation DB 104 accumulates user's travel history. A condition determination section 107 determines a condition for retrieval for performing accurate prediction, and a prediction section 108 predicts a travel destination using the condition for retrieval. An information-to-be-presented determination section 110 acquires information relating to the travel destination predicted by the prediction section 108 from a received information DB 802 or the like.

19 Claims, 28 Drawing Sheets

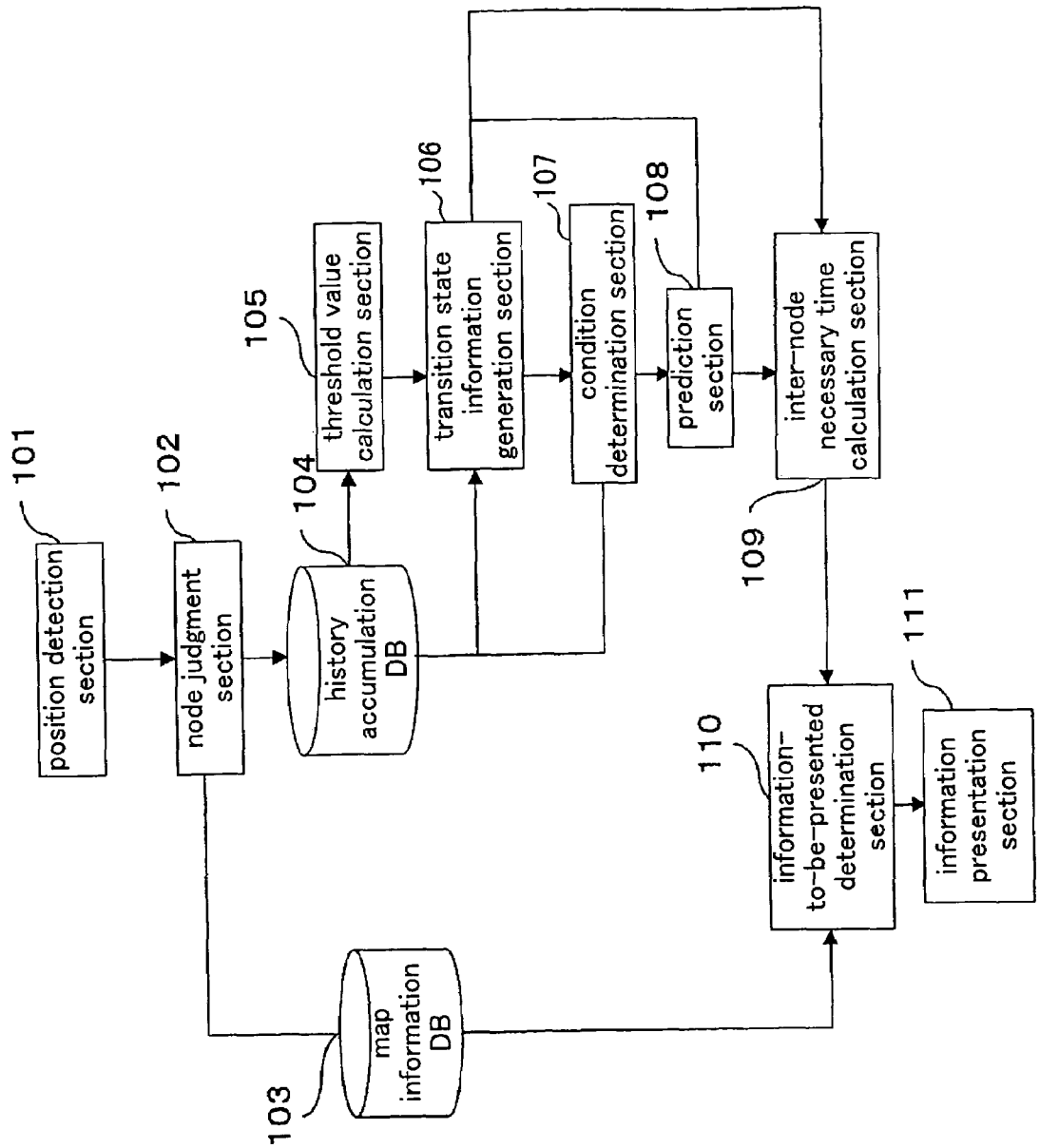

FIG.2

| node number | kind/name | east longitude | north latitude |
|---|---|---|---|
| C1 | intersection | 135' 20"35.45''' | 34' 44"35.22''' |
| C2 | intersection | 135' 24"35.74''' | 34' 44"86.5''' |
| C3 | intersection | 135' 22"6.22''' | 34' 44"78.18''' |
| C4 | intersection | 135' 22"10.4''' | 34' 45"60.75''' |
| C5 | intersection | 135' 22"20.0''' | 34' 46"79.37''' |
| C6 | intersection | 135' 20"42.76''' | 34' 46"70.48''' |
| C7 | intersection | 135' 22"35.39''' | 34' 47"35.82''' |
| . . | . . | . . | . . |
| L123 | landmark (home) | 135' 19"48.42''' | 34' 42"38.29''' |
| L124 | landmark (office) | 135' 30"22.33''' | 35' 12"23.6''' |
| . . | . . | . . | . . |
| A427 | area (Umeda, North) | 135' 29"51.9''' | 34' 41"57.0''' |
| A428 | area (Keihanna, Gakuentoshi) | 135' 46"18.80''' | 34' 44"30.65''' |

| node number | time |
|---|---|
| L6 | 8:05 a.m. on July 31 |
| C8 | 8:06 a.m. on July 31 |
| C12 | 8:08 a.m. on July 31 |
| C9 | 8:09 a.m. on July 31 |
| C34 | 8:11 a.m. on July 31 |
| . . | |
| L128 | 8:53 a.m. on July 31 |

(a)

| node number | time |
|---|---|
| L128 | 12:25 p.m. on July 31 |
| C140 | 12:29 p.m. on July 31 |
| C125 | 12:36 p.m. on July 31 |
| . . | |
| L68 | 1:33 p.m. on July 31 |

(b)

| node number | time |
|---|---|
| L6 | 8:05 a.m. on July 31 |
| C8 | 8:06 a.m. on July 31 |
| C20 | 8:08 a.m. on July 31 |
| L12 | 8:10 a.m. on July 31 |
| L12 | 1:40 p.m. on July 31 |
| C34 | 1:50 p.m. on July 31 |
| . . | |
| L6 | 9:20 p.m. on July 31 |

| genre | node ID | name |
|---|---|---|
| supermarket | L3 | C Co-op |
| | L52 | Supermarket Tama-chan |
| | . . | . . |
| shopping center | L131 | Kametani Golf Shop |
| | L40 | Monoqlo Shop No. 2 |
| | . . | . . |
| restaurant | L12 | Le Yamada |
| | L18 | Bonjour |
| | L77 | Family Host |
| | . . | . . |
| . . | . . | . . |

| name | east longitude | north latitude | detailed information | other |
|---|---|---|---|---|
| C Co-op | 136' 48" 25.49'" | 34' 20" 72.67'" | special sale! milk ¥120/l | Pict.jpg |
| Supermarket Tama-chan | 137' 18" 3.6'" | 34' 18" 10.9'" | Hokkaido produce on sale | |
| Kametani Golf Shop | 135' 22" 80.32'" | 35' 8" 33.84'" | present for five first-comers | Addv.mpeg |
| ... | ... | ... | ... | |
| Bonjour | 136' 45" 69.81'" | 34' 20" 50.7'" | ladies' day course meal 20% OFF | |

| node ID | probability value |
|---|---|
| L131 | 0.31 |
| L18 | 0.26 |
| L3 | 0.18 |
| L52 | 0.11 |

FIG.13

| item to be presented | link |
|---|---|
| Kametani Golf Shop | NULL |
| Bonjour | NULL |
| supermarket | C Co-op |
| | Supermarket Tama-chan |

FIG.18

| current node | priority number | predicted route |
|---|---|---|
| L8 | 1 | C2→C4→C7→C13→C20→L2 |
| | 2 | C2→C4→C8→C38→C40→C55→L43 |
| | 3 | C2→C4→C8→C38→C40→C15→C12→L16 |

FIG.19

| road name | section | information |
|---|---|---|
| Route No. 163 | Sumoto-kita to Sumoto-minami | 30 minutes required |
| Kansai Expressway | East Interchange to West Interchange | accident happened |

FIG.26
| landmark | index | detailed topic | other |
|---|---|---|---|
| F-Mart | bargain information | • snow crab direct from Hokkaido 30% OFF<br><br>• prime beef 20% OFF | • Crab.jpg<br>• Beef.jpg |
FIG.27
(A)
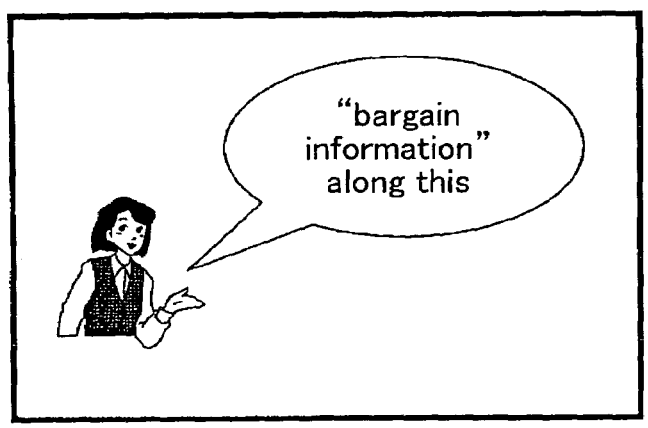
(B)
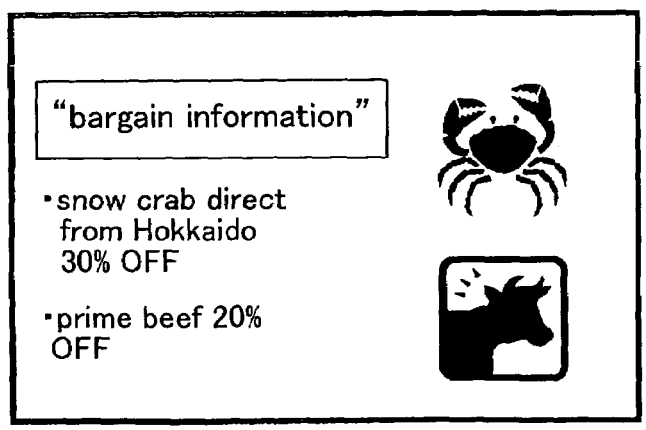

FIG.28 date condition table

| condition | month | date |
|---|---|---|
| holiday | June | 1, 2, 8, 9, 15, 16, ··· |
| | July | 6, 7, 13, 14, 20, 21, ···· |
| | . . . | . . . |
| weekday | the other days | | time condition table

| condition | time |
|---|---|
| morning | 5 a.m. to 11a.m. |
| afternoon | 12 p.m. to 5 p.m. |
| evening | 6 p.m. to 11 p.m. | season condition table

| condition | month |
|---|---|
| spring | March to May |
| summer | June to August |
| autumn | September to November |
| winter | December to March |

INFORMATION ACQUISITION METHOD, INFORMATION PRESENTING METHOD, AND INFORMATION ACQUISITION SYSTEM

TECHNICAL FIELD

The present invention relates to a technology for predicting a travel destination from the travel history while storing users' travel history, and acquiring information relating to the predicted travel destination through a network or the like, using information equipment capable of sensing position information, such as a car navigation system, a portable phone, a PDA, and the like.

BACKGROUND ART

Through widespread use of the Internet, various sorts of information floods around our environment. Users who utilize information equipment can access information to be retrieved by inputting a keyword to the information equipment. It is much arduous for users to input by themselves a keyword connected directly to information to be retrieved every time when information is desired. For example, inputting a keyword to a terminal such as a mobile phone on the move and setting a car navigation system on the move by means of an automobile are taxing and may be dangerous operation under certain circumstances. For this reason, many users of car navigation systems drive without setting any destination.

As one of countermeasures for tackling this problem, a method has been provided in which information that a user might desire is acquired and presented in advance by predicting user's behavior.

There has been proposed, for example, an information system boarded on a car in which a travel starting point and travel end point are stored as a travel history together with conditions such as date in a terminal boarded on the car; upon detection of start of user's engine, the travel history is retrieved using conditions such as the current position, the date, and the like as keys; the destination where the user has been with the most highest frequency in the past and necessary time that has been required for reaching the destination in the past are referenced; and then, the destination and the necessary time are displayed to the user automatically (Patent Document 1).

Further, a information presenting method has been proposed in which given behavior of a user carrying an information terminal is divided by units of travel behavior and stopping (halt) behavior; information on an appearance frequency, contents of behavior immediately before and immediately after the appearance, and the like for the given behavior are grouped and stored in a server as a travel history; a user who satisfies a condition specified by a service provider (for example, staying around Kyoto station at the time between 9 a.m. and 2 p.m. on Sunday) is found by behavior prediction from the history information; and then, commercial information is provided to the thus found user (Patent Document 2).

(Patent Document 1) Japanese Patent Application Laid Open Publication No. 11-149596A (particularly, FIG. 1)

(Patent Document 2) Japanese Patent Application Laid Open Publication No. 2000-293540A (particularly, FIG. 1)

PROBLEMS THAT THE INVENTION IS TO SOLVE

The aforementioned conventional techniques, however, involve the following problems.

First, the results of destination prediction depend on selection of conditions (specification of date; date and starting time; data, time, and weather; and so on), and it can be inferred that the necessary conditions may differ depending on the starting point. In this connection, appropriate selection of a condition for retrieval is indeed important for bringing the prediction to success. However, neither Patent Document 1 nor 2 refers to this point of view.

Further, in Patent Document 1, the history database used for retrieval stores combinations of starting points and target destinations merely chronologically. This increases high calculation cost for database retrieval, and it takes much time until a prediction result is obtained from a start of the operation at engine initiation. Moreover, the necessary time is calculated by referencing only the past travel record, taking no account of the current traffic state, resulting in inaccurate calculation. The history database does not store user's travel route, so that a route that the user might takes cannot be predicted. Therefore, even if the current traffic state and/or road information can be referenced, useful information such as road information relating to the route cannot be presented to the user. In addition, it is rare that a target destination can be specified upon finding of a starting point while it is usual that prediction can be established only after the route information including the starting point is found as the car runs about.

Also, in Patent Document 2, travel behavior that connects the same starting point and the same destination is stored as one group regardless of difference in route thereof, and therefore, accurate route prediction can not be performed when a plurality of routes are present. Further, only the relationship between the preceding and following behavior is stored, so that four or more succeeding user's behavior cannot be reproduced, resulting in incomplete prediction. Moreover, it is difficult to select an appropriate condition, which a service provider or a user must set for prediction, for highly accurate prediction.

The present invention has been made in view of the above problems and has its objective of, in the technology for predicting a user's travel destination from a travel history and acquiring information relating to the predicted destination, increasing accuracy of the destination prediction compared with the conventional one.

SUMMARY OF THE INVENTION

The present invention provides, as an information acquisition method for acquiring information relating to a destination of a mobile body, a method including a first step of accumulating, as a travel history, a travel route obtained from the history of position information of the mobile body; a second step of determining, as a condition for retrieval, a kind and a category of a key at retrieval from the travel history; and a third step of performing retrieval on the travel history under the condition for retrieval and predicting one or more travel destinations or routes where the mobile body will advance, whereby information relating to the predicted travel destinations or routes is acquired.

In the present invention, the kind and the category of a key for retrieval from the accumulated travel history are determined as a condition for retrieval, and a travel destination or a travel route where the mobile body will advance is predicted based on the result of the retrieval under the condition for retrieval. Herein, the kind of a key includes time, date, weather, a driver, a fellow passenger, and the like. Also, the category herein means a segment or a range of a key, and various categories of various ranges for grouping may be thought in the sense of abstract level. For example, "morning," "time between 6 a.m. and 10 a.m.," "time between 8 a.m. and 9:30 a.m." may be though for time "8:30 a.m." Further, referring to date, "Friday" may be grouped in a category "weekday" or a category "weekend". Similarly, it is though that, for example, the weather may be categorized into "fine weather," "precipitation possibility of less than 40%," and the like, and drivers and fellow passengers may be categorized into "user of Satos," "person at age of exceeding 25," "father," and the like. In this way, the prediction after determination of a condition for retrieval at retrieval from the travel history leads to more accurate prediction than conventional one, resulting in acquisition of appropriate information.

Further, the present invention provides, as an information presenting method for presenting information relating to a destination of a mobile body, a method including a first step of acquiring relating information on a predicted travel destination by a information acquisition method according to the present invention; and a second step of determining information to be presented relating to the travel destination based on the information acquired in the first step, whereby the determined information to be presented is presented.

According to the present invention, prediction of a destination of a mobile body can be performed more accurately than the conventional one and appropriate information can be acquired, with a result of more appropriate information presentation to a user.

Moreover, the present invention provides, as an information acquisition system, a system including: a history accumulation section that accumulates, as a travel history, a travel route obtained from a history of position information of a mobile body; a condition determination section that determines, as a condition for retrieval, a kind and a category of a key at retrieval from the travel history accumulated in the history accumulation section; and a prediction section that performs retrieval on the travel history under the condition for retrieval and predicts one or more travel destinations for which the mobile body will advance based on the retrieval result, whereby information relating to the travel destination predicted by the prediction section is acquired.

According to the present invention, a kind and a category of a key at retrieval from the accumulated travel history are determined as a condition for retrieval, and a travel destination or a travel route where the mobile body will advance is predicted based on the result of the retrieval under the condition for retrieval. Whereby, prediction can be performed more accurately than the conventional one, with a result of more appropriate information acquisition.

In addition, the present invention is a program for allowing a computer installed in at least one of information equipment and a server to execute an information acquisition method according to the present invention.

BRIEF DESCRIPTION OF THE DRAWINGS

FIG. 1 is a drawing showing a constitution of an information acquisition system according to the first embodiment of the present invention.

FIG. 2 is a drawing indicating node relating information stored in a map information database.

FIG. 3(A) and FIG. 3(B) are drawings each indicating one example of travel history data accumulated in a history accumulation database.

FIG. 9 is a drawing indicating genre information stored in the map information database.

FIG. 10 is a drawing indicating an example of information accumulated in a received information database.

FIG. 12 is a drawing indicating predicted destination nodes and prediction probabilities thereof.

FIG. 13 is a drawing indicating items of determined information to be presented.

FIG. 18 shows example of predicted route information.

FIG. 19 is a drawing indicating concrete examples of road/traffic information accumulated in the received information database.

FIG. 26 is a drawing indicating an example of information accumulated in the received information database.

FIG. 27(A) and FIG. 27(B) are drawings illustrating presented information in the sixth embodiment of the present invention.

FIG. 28 indicates examples of categories of keys each serving as a condition for retrieval.

Figure 4:
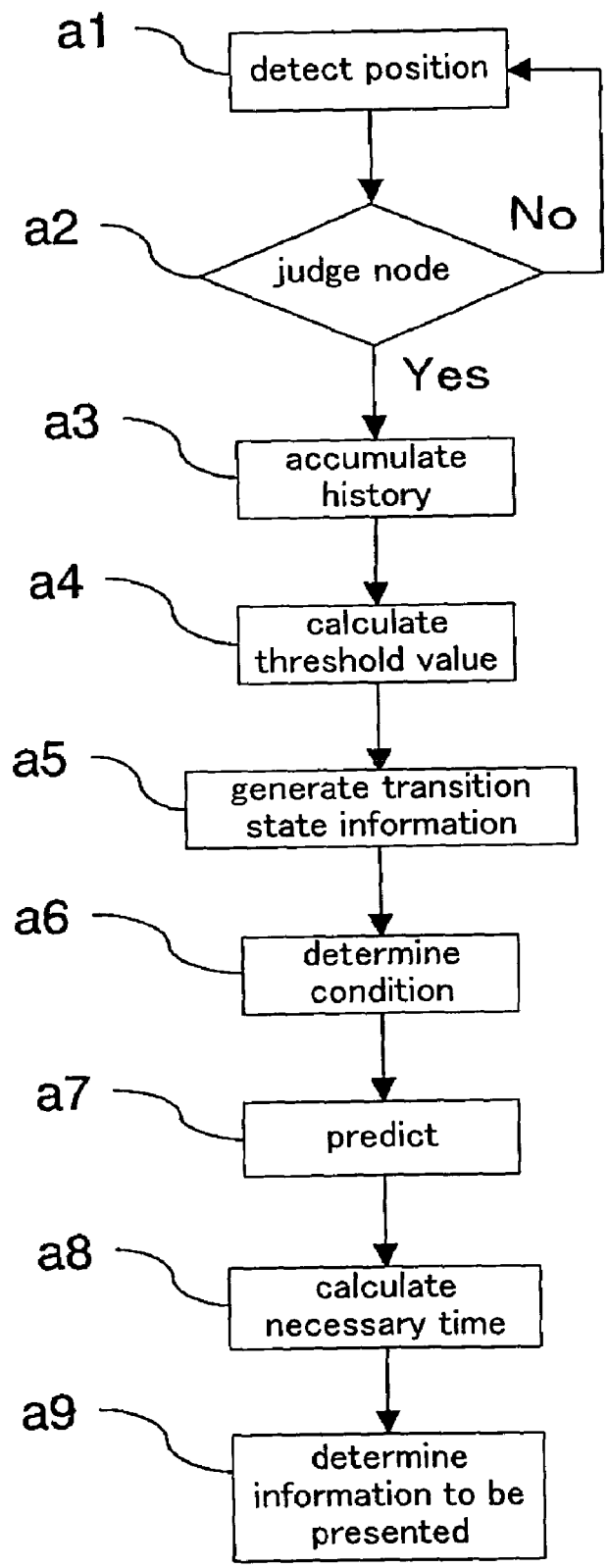
FIG. 4 is a flowchart depicting a processing flow in the first embodiment of the present invention.

BEST MODE FOR CARRYING OUT THE
INVENTION

The first aspect of the present invention provides an information acquisition method for acquiring information relating to a travel destination of a mobile body, including: a first step of accumulating, as a travel history, a travel route obtained from a history of position information of the mobile body; a second step of determining, as a condition for retrieval, a kind and a category of a key at retrieval on the travel history; and a third step of performing retrieval on the travel history under the condition for retrieval to predict one or more travel destinations or travel routes where the mobile body will advance, based on a result of the retrieval, wherein information relating to a predicted travel destination or a predicted travel route is acquired.

The second aspect of the present invention provides the information acquisition method of the first aspect, wherein the kind of the key in the second step includes at least one of time, date, weather, and a position and a travel route of the mobile body.

The third aspect of the present invention provides the information acquisition method of the first aspect, further including: a step of generating transition state information indicating past position transition of the mobile body from the travel history, wherein in the third step, the retrieval is performed on the transition state information.

The fourth aspect of the present invention provides the information acquisition method of the first aspect, wherein in the second step, determination of the condition for retrieval is performed based on statistical processing.

The fifth aspect of the present invention provides the information acquisition method of the fourth aspect, wherein the second step includes: a step (a) of selecting a candidate of the condition for retrieval; and a step (b) of calculating entropy for each prediction probability value of one or more travel destinations where the mobile body might advance under a selected condition candidate, and wherein the steps (a) and (b) are repeated alternately, and the condition for retrieval is specified from the selected candidates based on values of the calculated entropies.

The sixth aspect of the present invention provides the information acquisition method of the first aspect, wherein in the third step, each prediction probability of one or more travel destinations where the mobile body might advance is obtained, and prediction is performed based on each obtained prediction probability.

The seventh aspect of the present invention provides the information acquisition method of the first aspect, wherein the travel history is accumulated in a form of inter-node transition.

The eighth aspect of the present invention provides the information acquisition method of the seventh aspect, wherein at least one of nodes indicates a landmark, an area, or an intersection.

The ninth aspect of the present invention provides the information acquisition method of the seventh aspect, wherein an intersection through which the mobile body have traveled in two or more directions among intersections in a travel route is set as a node.

The tenth aspect of the present invention provides the information acquisition method of the first aspect, wherein in the first step, the travel history is accumulated in a form of segment of travel start and travel end.

The eleventh aspect of the present invention provides the information acquisition method of the first aspect, further including the step of: predicting a new travel destination or a new travel route where the mobile body will advance before the mobile body starts a travel from the travel destination or the travel route predicted in the third step.

The twelfth aspect of the present invention provides the information acquisition method of the first aspect, wherein information relating to the predicted travel destination or the predicted travel route is acquired via a network.

The thirteenth aspect of the present invention provides an information presenting method for presenting information relating to a travel destination of a mobile body, including: a first step of acquiring relating information on a travel destination predicted according to the information acquisition method of the first aspect; and a second step of determining information to be presented on the travel destination based on the information acquired in the first step, wherein the determined information to be presented is presented.

The fourteenth aspect of the present invention provides the information presenting method of the thirteenth aspect, wherein the second step includes the steps of: referencing information indicating a correspondence among positions, names, and genre names to which the positions belong; and determining at least one of the name and the genre name of the travel determination as information to be presented.

The fifteenth aspect of the present invention provides the information presenting method of the fourteenth aspect, wherein the first step includes the step of obtaining a prediction probability of the predicted travel destination, and the second step includes the step of determining, as information to be presented, the name of the predicted destination when the prediction probability of the predicted travel destination exceeds a predetermined value, and otherwise determining the genre name thereof as information to be presented.

The sixteenth aspect of the present invention provides the information presenting method of the thirteenth aspect, wherein the first step includes the step of calculating an estimated necessary time for transferring from a current position of the mobile body to the predicted travel destination as relating information by referencing the travel history.

The seventeenth aspect of the present invention provides the information presenting method of the sixteenth aspect, wherein in the first step, road/traffic information up to the travel destination is acquired via the network, and in the second step, an actual necessary time up to the travel destination with consideration of traffic circumstances is estimated by referencing the estimated necessary time and the road/traffic information.

The eighteenth aspect of the present invention provides the information presenting method of the seventeenth aspect, wherein in the second step, when the estimated actual necessary time does not satisfy a predetermined condition, a route other than the predicted travel route is searched.

The nineteenth aspect of the present invention provides the information presenting method of the thirteenth aspect, wherein the information to be presented includes commercial information relating to the travel destination.

The twentieth aspect of the present invention provides the information presenting method of the thirteenth aspect, wherein the information to be presented includes road/traffic information up to the travel destination.

The twenty-first aspect of the present invention provides the information presenting method of the thirteenth aspect, wherein in the second step, a cognitive load of a user who receives information presentation is taken account in determining information to be presented.

The twenty-second aspect of the present invention provides an information acquisition system including: a history accumulation section that accumulates, as a travel history, a travel route obtained from a history of position information of a mobile body; a condition determination section that determines, as a condition for retrieval, a kind and a category of a key at retrieval on the travel history accumulated in the history accumulation section; and a prediction section that performs retrieval on the travel history under the condition for retrieval to predict one or more travel destinations for which the mobile body will advance based on a result of the retrieval, wherein information relating to the travel destination predicted by the prediction section is acquired.

The twenty-third aspect of the present invention provides the information acquisition system of the twenty-second aspect, wherein the history accumulation section includes a transition state information generation section that generates transition state information indicating past position transition of the mobile body from the accumulated travel history, and the prediction section performs retrieval on the transition state information.

The twenty-fourth aspect of the present invention provides a program for allowing a computer that at least one of information equipment and a server includes to execute the information acquisition method of the first aspect.

The embodiments of the present invention will be described below with reference to the drawings. A car navigation system is referred to as an example in each of the following embodiments, but the present invention is not limited thereto. The present invention can be realized as well in, for example, potable phones, PDAs, personal computers, and the like, only if they are usually carried along with a user and has means for detecting position information. Also, a part of the functions that a car navigation system has may be provided in a server on a network.

First Embodiment

FIG. 1 shows a constitution of a car navigation system as an information acquisition system according to the first embodiment of the present invention. In FIG. 1: reference numeral 101 denotes a position detection section that detects information on the current position of the car navigation system (the current position of an automobile as a mobile body on which the car navigation system is boarded); 102 denotes a node judgment section that judges whether or not the current position detected by the position detection section 101 corresponds to a node which will be described later; and 103 denotes a map information database that stores map information to be used for car navigation.

Also, reference numeral 104 denotes a history accumulation database (DB) that accumulates a travel route obtained from a history of the position information of the automobile as a travel history. Herein, when the current position is judged as a node in the node judgment section 102, the node is stored. The structure of data accumulated in the history accumulation DB 104 will be described later. Reference numeral 105 denotes a threshold value calculation section that calculates a threshold value for a node appearance frequency which is used for generating transition state information (described later) by utilizing information on the appearance frequency of a node accumulated in the history accumulation DB 104; and 106 denotes a transition state information generation section that generates transition state information indicating past position transition of the automobile from the travel history accumulated in the history accumulation DB 104. Herein, information relating to transition between nodes each appearing with a frequency over the threshold value calculated in the threshold value calculation section 105 is generated together with additional information such as the appearance frequency, travel date and time, and the like. The node judgment section 102, the history accumulation DB 104, the threshold value calculation section 105, and the transition state information generation section 106 compose a history accumulation section.

Reference numeral 107 denotes a condition determination section that determines a condition for retrieval for obtaining an appropriate prediction result from information indicating the current state accumulated in the history accumulation DB 104 by utilizing the transition state information; and 108 denotes a prediction section that performs prediction of a future travel destination from the transition state information, using the condition for retrieval determined by the condition determination section 107.

Further, reference numeral 109 denotes an inter-node necessary time calculation section that calculates, by referencing the travel history, a travel time necessary for transferring between a node of the current position and a node predicted by the prediction section 108; 110 denotes an information-to-be-presented determination section that determines, by referencing the map information DB 103, information to be presented to a user relating to the node predicted by the prediction section 108; and 111 denotes an information presentation section that presents to the user the information to be presented determined by the information-to-be-presented determination section 110. The information-to-be-presented determination section 110 determines, as information to be presented, information that specifies a node such as a name, an estimated necessary time to reach the node, estimated arrival time, and the like.

FIG. 2 indicates information relating to nodes stored in the map information DB 103. In the present embodiment, intersections, landmarks, area names, and the like are expressed by idea of node, and names unique to a user, such as "his/her office," "Ms A's house," and the like can be registered in addition to proper names such as "XX intersection," "YY Amusement Park," and the like.

In FIG. 2, each node number indicates an ID number assigned to a node in one-to-one correspondence, wherein the node number is assigned as "CXX" to an intersection, as "LXX" to a landmark, "AXX" to an area, and the like. Also, the nodes are stored together with information indicating the positions such as latitude/longitude information of representative points. The latitude/longitude information merely indicates position information of the representative points, and information indicating ranges (radius of the representative point as a center, or the like) respectively corresponding to an intersection, a landmark, an area, or the like is present actually. It is thought that: referring to, for example, an intersection and a landmark, each range may be a range within a 10-m radius of a representative point as a center; and referring to an area, each range may be a range within a 1-km radius of a representative point as a center. Further, the ranges of individual areas may be different from one another. The position information may be, for example, an address, rather than the latitude and longitude.

It is noted that the names of intersections, landmarks, and areas may be described instead of the ID number, and either of them is acceptable only if they are information capable of specifying nodes in one-to-one correspondence. Information for specifying nodes representing intersections, landmarks, areas, and the like is stored in the history accumulation DB 104.

It is also noted that any nodes can be added and deleted according to user's travels. For example, it is possible that an intersection that the user's automobile has traveled in two or more directions may be set as a node. In detail, as shown in FIG. 30(a), the user has traveled in two directions through the intersections a and c, and accordingly, the intersections a and c are set as nodes Na and Nc, and the intersection b, through which the user has traveled in only one direction, is not set as a node.

Figure 30:
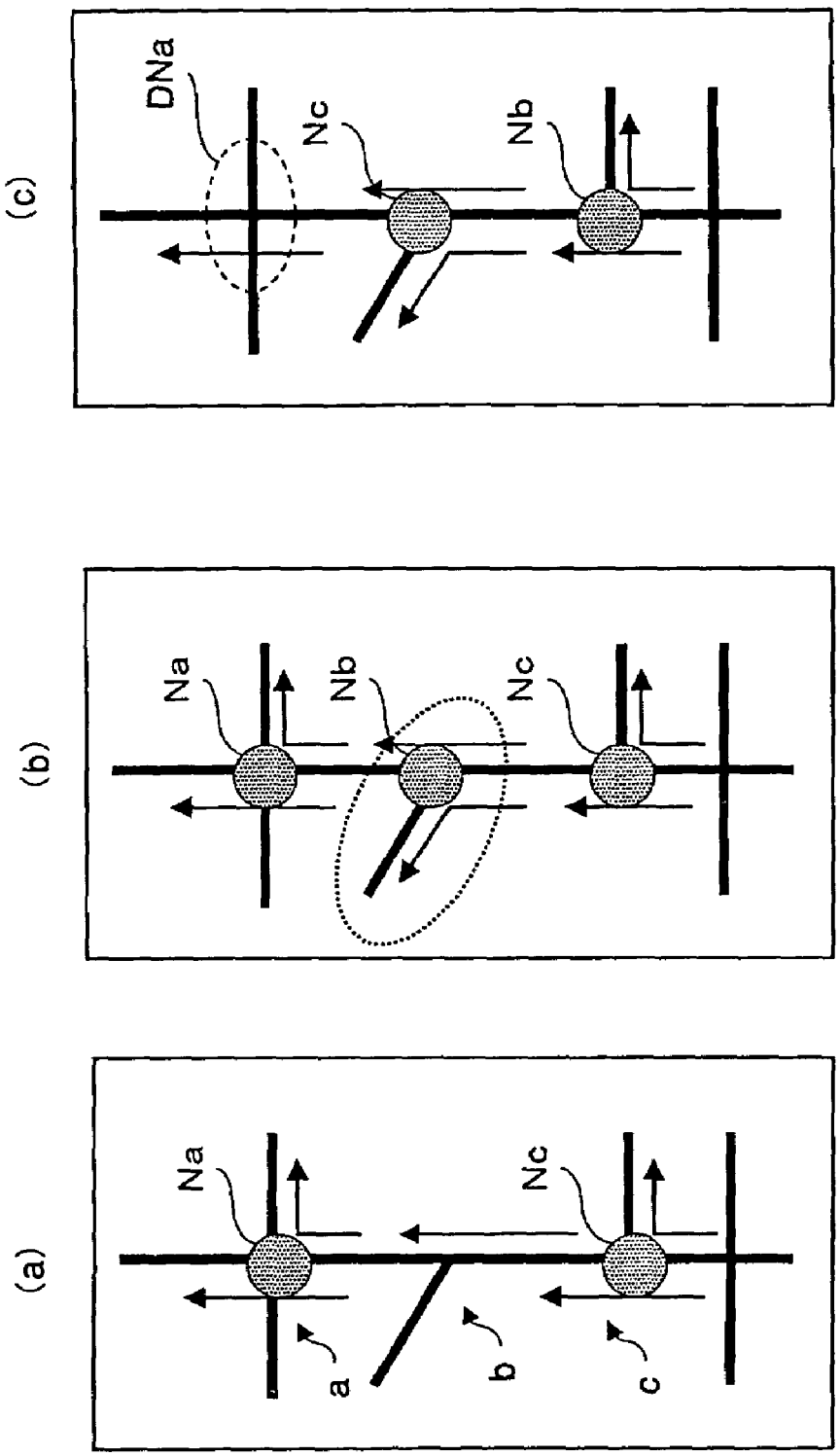
FIG. 30 is a drawing for explaining alternation of nodes to/from areas.

Thereafter, when the user travels in another direction through the intersection b, as shown in FIG. 30(b), a node Nb is added as the intersection b for the reason that the user travels in two or more directions. Alternatively, as shown in FIG. 30(c), if the user travels in only one direction through the intersection a for a past predetermined period, the node Na is deleted (DNa). It is to be noted that such node setting not necessarily needs map data and can be performed using only the user's travel history.

FIG. 3 indicates one example of data accumulated in the history accumulation DB 104. In the example of FIG. 3, pairs of the node numbers and times of passage therethrough are stored chronologically. For example, it indicates that the user departed from, passed through and stops at a node L6 at 8:05 a.m. on July 31, a node C8 at 8:06 a.m. on the same day, and a node C12 at 8:11 a.m. on the same day, respectively. The node series may be accumulated on per segment basis according to a starting point and a destination, namely, by a unit of "segment from engine start (travel start) to engine stop (travel end)" as shown in FIG. 3(a), or may be accumulated in a segment unit of "segment from departure from home to going back home" as shown in FIG. 3(b). Alternatively, the node series may be accumulated in a segment unit of "the same day" or even with no segments. Accumulation of a travel history by segment from travel start to travel end enables prediction of a travel destination based on detailed route information.

It is to be noted that the time is expressed in terms of month, date, hour and minute in FIG. 3, but year, second, day of the week, and the like may be stored in addition, or only combination of any of these units may be stored. Also, in the case where the node series is segmented on a travel-by-travel basis for accumulation, it is possible that each time of engine start and engine stop is recorded and only a node number is recorded for a node through which the automobile passes. Further, not only the information relating to time and date but also information relating to a key serving as a condition for retrieval to be determined by the condition section 107, such as information on weather, a driver, or a fellow passenger may be stored.

The processing flow in the present embodiment will be described next with reference to the flowchart of FIG. 4.

When the current position of the car navigation system is detected in the position detection section 101 (step a1), the node judgment section 102 performs judgment as to whether the current position is a node or not by referencing the map information DB 103 (step a2). If the node judgment section 102 judges the current position to be a node, an ID number indicating the node is accumulated in the history accumulation DB 104 (step a3). At this time, collateral information on time, date, weather, and the like is accumulated in combination.

The threshold value calculation section 105 calculates a threshold value of the number of times of appearance for selecting a node for composing transition state information by referencing the history accumulation DB 104 (step a4). Various methods can be considered for the threshold value calculation. For example, it may be calculated according to the amount of data accumulated in the history accumulation DB 104, may be calculated by obtaining distribution of appearance times of all nodes, or may be calculated by obtaining an average of the appearance times of all the nodes and multiplying it by a given constant. The calculation may be performed by any methods.

When the threshold value is calculate in the threshold value calculation section 105, the transition state information generation section 106 generates transition state information by selecting a node of which appearance time exceeds the threshold value by utilizing the data in the history accumulation DB 104 (step a5).

Figure 5:
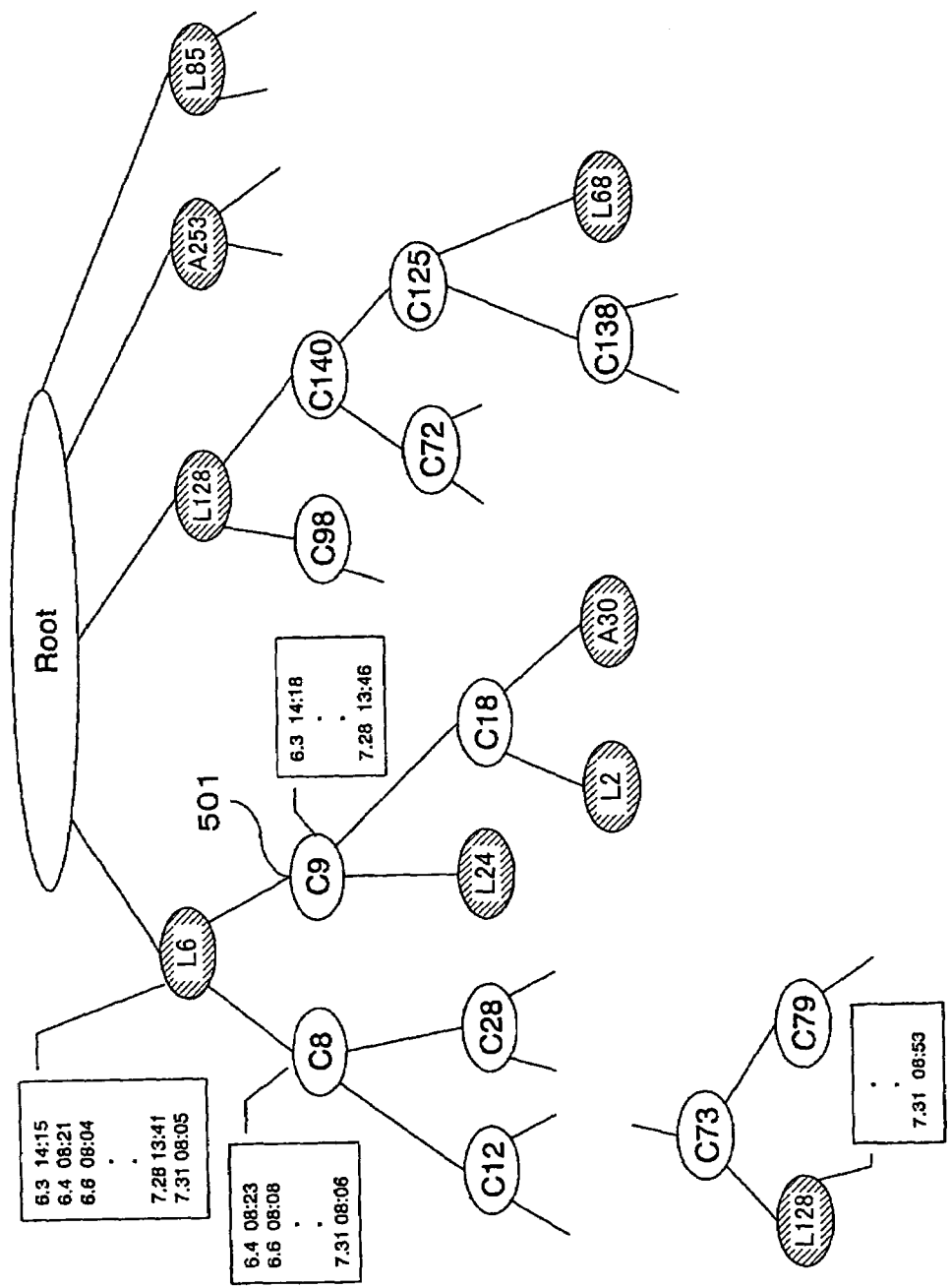
FIG. 5 is a drawing showing one example of transition state information.

FIG. 5 shows one example of the transition state information. The transition state information has a tree structure, as shown in FIG. 5, in such a fashion that: nodes (starting points) of a landmark or an area from which a travel starts are arranged at the uppermost level immediately below a root; histories of past node transition from the respective nodes as base points, which indicate histories of travels among intersections, are expressed in a tree structure; and nodes (destinations) such as a landmark, an area, and the like where the travel ends are located at the lowermost level of the respective branches. Each node, which accompanies state information indicating that the automobile departs from, passes through or arrives at the node (data indicated in rectangular areas in FIG. 5), can be retrieved through the tree structure under a condition such as "a node where the automobile travels in a period from 9 a.m. to 12 p.m. of weekday as a retrieval key. Also, the number of pieces of the accompanying state information offers to respective frequencies of departure from, passing through and arrival at the node. Thus, the transition state information contains information relating to the degree of transition, and this enables more efficient retrieval than retrieval of all the accumulate travel histories.

In FIG. 5, the dates and times indicated in FIG. 3 are recorded as state information. Key information serving as a condition for retrieval, such as the aforementioned information on a driver and a fellow passenger may be recorded in addition. Also, the state information is recorded in some of the nodes in FIG. 5, but is recorded in all the nodes actually.

Figure 6:
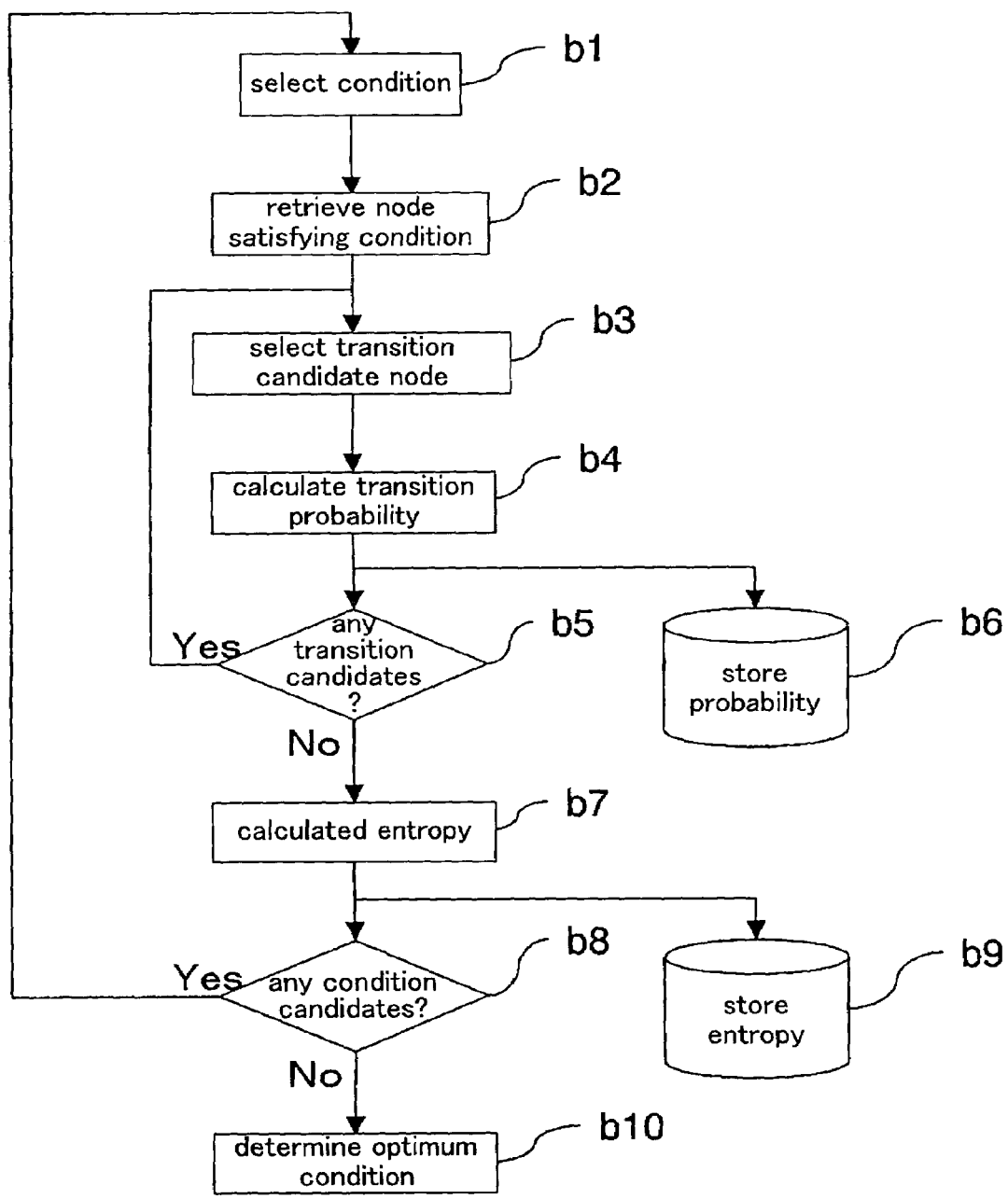
FIG. 6 is a flowchart depicting one example of operation of a condition determination section.

Upon generation of the transition state information, the condition determination section 107 determines a condition for retrieval appropriate to prediction by the prediction section 108 (step a6). FIG. 6 is a flowchart depicting one example of the operation of the condition determination section 107.

The condition determination section 107 acquires information relating to the current state by referencing the history accumulation DB 104. A field for storing information relating to the current travel is present in the history accumulation DB 104 in addition to a field for storing the past history information so that a route from departure to the current node can be extracted. Suppose that: the current position is a node "C9"; a travel history from departure is "L6 to C9"; and the date and time is 2 a.m. on June 3. Wherein, referring to date and time conditions (kinds of a key), any conditions (categories) such as "weekday," "afternoon," and "summer" can be extracted by referencing tables as indicated in FIG. 28.

After the condition determination section 107 selects one combination, for example, "weekday and C9" among the conditions (step b1), a node satisfying the condition is retrieved from the transition state information (step b2). In FIG. 5, the node "C9" 501 corresponds to this. Then, one of nodes (nodes located at the lowermost level) having a possibility of future transition from this node as a base point is selected as a transition candidate node (step b3), a probability of transition toward the selected node is calculated (step b4), and then, the obtained value is stored (step b6).

The following method is employable as the transition probability calculation method.

Transition probability $P(Ln|C9)=\text{Freq}(Ln|\text{Cond})/\text{Freq}(C9|\text{Cond})$ where the condition at that time is Cond, a frequency of appearance at the base point C9 under the condition Cond is Freq(C9|Cond), and a frequency that a transition candidate node (Ln) satisfies the condition Cond is Freq(Ln|Cond).

When the transition probability of one transition candidate node is calculated, whether other transition candidate nodes are present or not under the same condition is judged (step b5). When it is present, the transition probability of that transition candidate node is calculated as well and the calculated value is stored.

When no other transition candidate is present (No in b5), entropy for the transition probability under the condition is calculated from the stored transition probabilities (step b7), and the calculated value is stored together with the condition (step b9). One example of the entropy calculation method where a probability of a travel toward one Li of destinations where the driver has been in the past is Pi under a given condition is indicated in the following expression.

$$\Sigma Pi(-\log_2 Pi) \tag{1}$$

After storing the entropy, whether any combinations (e.g., possible combinations, "weekday and C9 and afternoon," "weekday and "L6 to C9" and summer," and the like) other than the already selected condition are present or not is judged (step b8). When it is present, the possible condition is selected and the same operation is repeated.

When the entropy calculation for all of the condition combinations is completed, the condition combination of which entropy value stored is the smallest is determined as an optimum condition for retrieval (step b10). In other words, a kind and a category of a key used for retrieval of the travel history performed for travel destination prediction are determined as a condition for retrieval.

Referring again to FIG. 4, when the condition for retrieval is determined by the condition determination section 107, the prediction section 108 performs retrieval on the travel history under the condition for retrieval, and predicts a travel destination where the automobile will advance based on the retrieval result. Herein, a future transition destination node is determined by referencing the transition state information generated from the travel history (step a7). The node determination can be executed by various methods, for example, a method of selecting the node having the highest prediction probability, a method in which a range is provided to each node according to the value of the prediction provability and a node having a range to which a random number value belongs is selected, a method of selecting all nodes having probability values exceeding a predetermined value, and a method of selecting a given number of nodes in order from the node having the highest probability value. In addition, prediction of a node of a transition destination naturally enables prediction of a route to the predicted node by referencing the transition state information.

Upon prediction of the node of the transition destination, the inter-node necessary time calculation section 109 estimates a necessary time for transferring from the current node to the node of the predicted destination (step a8). For example, the transition state information is retrieved using the current node and the node of the predicted destination as a key, and an average value of time periods required for traveling between the nodes in the past is set as an estimated necessary time. For this setting, the necessary time may be obtained after the target information to be retrieved is narrowed by a condition such as date, time period, and the like. Alternatively, the necessary time may be calculated by referencing the history accumulation DB 104 in the case where information not indicated in the transition state information is stored in the history accumulation database DB 104.

Figure 7:
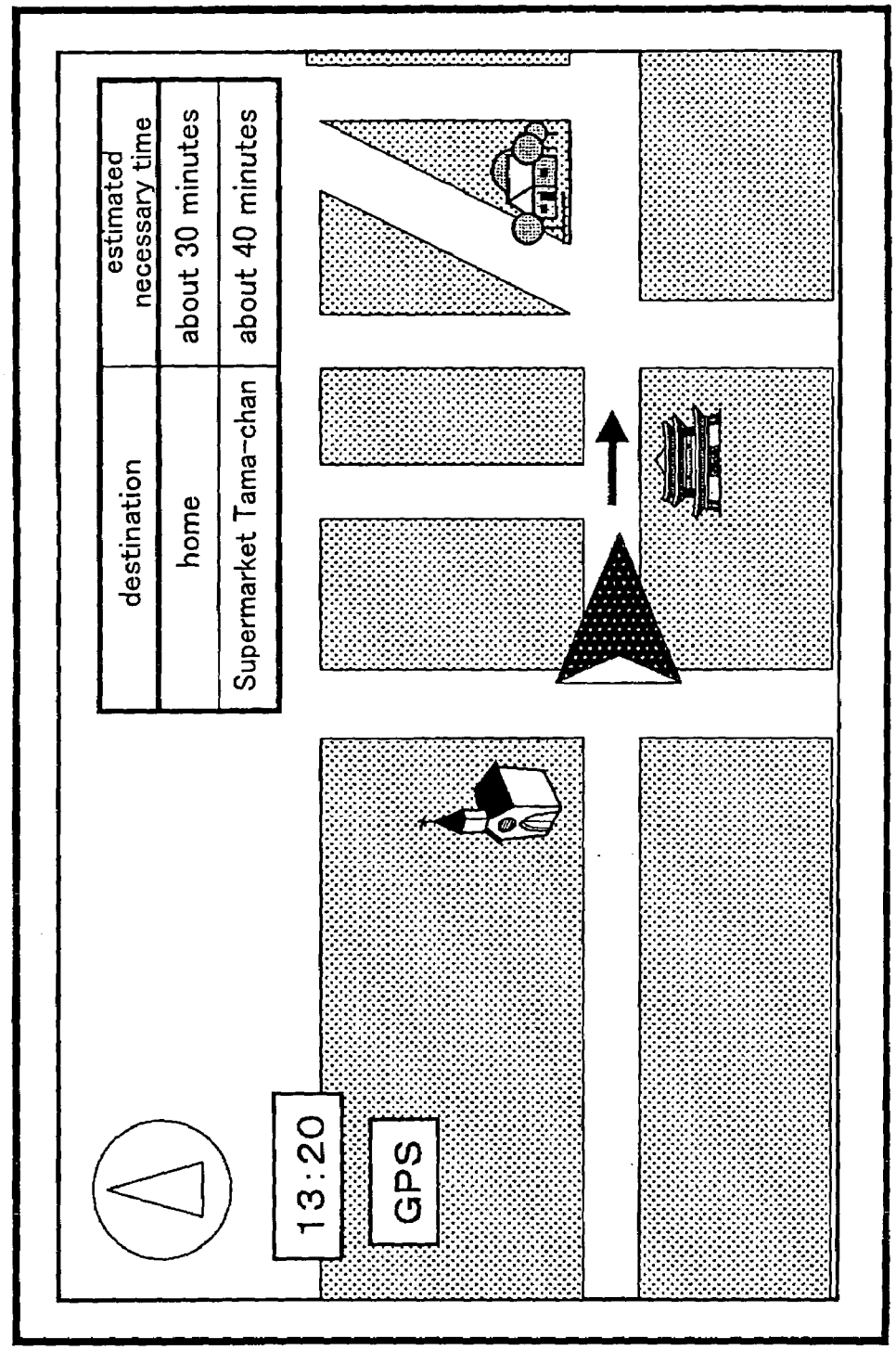
FIG. 7 is a drawing illustrating a screen example which presents information to a user.

The information-to-be-presented determination section 110 determines information to be presented to the user by referencing the map information DB 103, such as information on the name and other materials of the predicted node, and information relating to the estimate necessary time and the estimated arrival time (step a9). The determined information is presented to the user (a driver and a fellow passenger) through the information presentation section 111. One example of the screen that presents information to a user is shown in FIG. 7.

It should be noted that the information to be presented may be acquired via a network. In this case, it is possible that the car navigation system selects and presents information relating to a travel destination or a travel route predicted from received information. Or, it is possible that information indicating a predicted travel destination or travel route is uploaded to a server on the network from the car navigation system, the relating information is selected by the server, and then, only information selected in the server is received by the car navigation system.

In the latter case, it is further possible that the history information accumulated in the history DB 104 is uploaded to the server for allowing the server to perform both prediction of a travel destination and selection of information based on the prediction result. Wherein, it is expected that some users are reluctant to upload all of their travel histories to the server in view of privacy protection. For such users, it is rational to upload least information, that is, only the predicted travel destination. In other words, all the travel histories may be uploaded to the server only for a user who provides permission.

It is noted that the present embodiment selects only a node appearing with a frequency exceeding the predetermined value in generating the transition state information from the travel history, which is for increasing the retrieval efficiency by reducing the size of the data to be retrieved. In other words, node selection is not necessarily needed in a case with no special limitation on the retrieval efficiency, and the transition state information may be generated utilizing all the nodes accumulated in the history accumulation DB 104.

Further, in the present embodiment, prediction is performed in such a manner that the transition state information is generated so as to contain all the state information having a possibility of being utilized in prediction, and then, a condition combination of which entropy has the minimum value is determined as a condition for retrieval by referencing the transition state information. Besides this method, however, a method is considered in which the condition determination section 107 determines an appropriate condition in advance by performing the same processing as in the present embodiment by referencing the history accumulation DB 104 and the transition state information generation section 106 generates transition state information under the determined condition.

It is to be noted that determination of transition state information is performed by calculating entropy for the transition probability of the nodes (prediction probability of the predicted travel destination), but the present invention is not limited thereto. For example, the condition for retrieval may be determined based on another statistical processing.

Other Examples of Determination Method of Condition for Retrieval (1)

Figure 29:
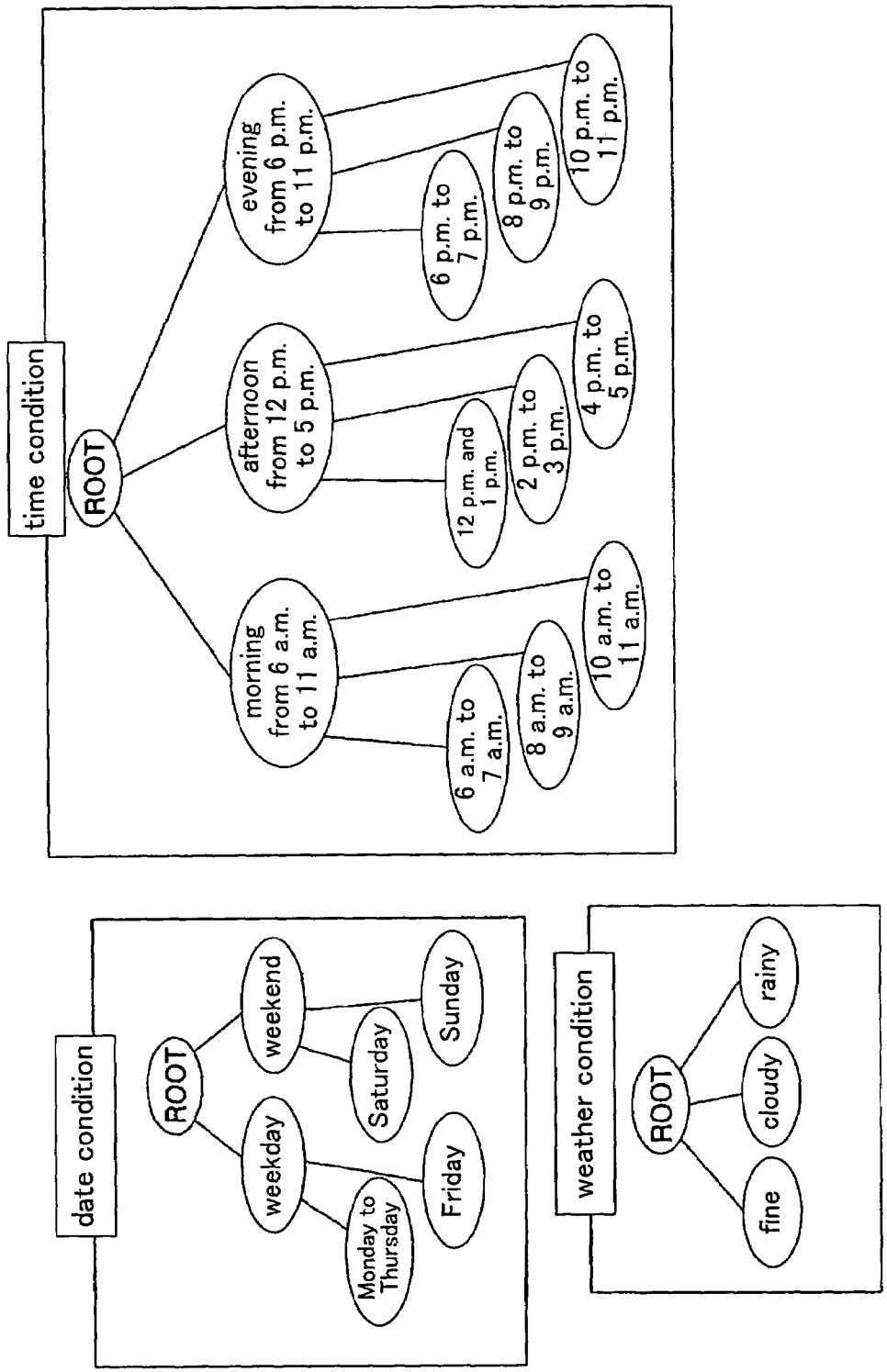
FIG. 29 is a drawing illustrating a category structure of which keys serving as conditions for retrieval are arranged in hierarchy.
Figure 31:
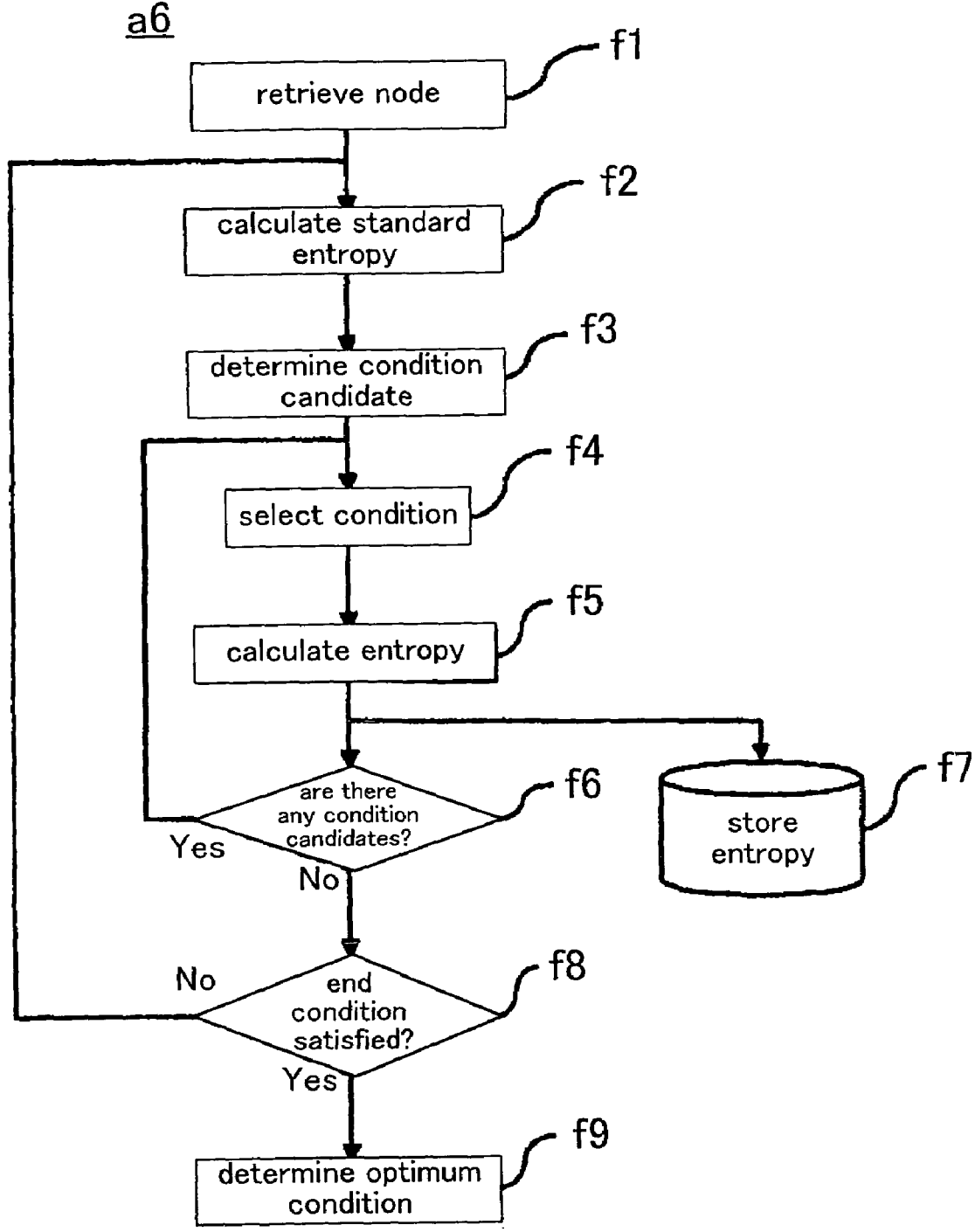
FIG. 31 is a flowchart depicting another example of the operation of the condition determination section.

Another processing example in the condition determination section 107 will be described with reference to the flowchart of FIG. 31. Herein, a hierarchical category structure relating to the kinds of a key such as "date," "time," and "weather" as shown in FIG. 29 is supposed as a variation of the condition.

Suppose that: the route information until the current time is "L6 to C9"; the current node is C9; and the current state includes "Monday," "2 p.m.," and "fine weather."

First, the current node satisfying the route information "L6 to C9" is retrieved from the transition state information indicated in FIG. 5 (step f1). In FIG. 5, the node 501 corresponds to this.

Next, likewise the above-mentioned procedures, each probability of transitions toward the transition candidate nodes in case where the condition Cond is set to be the route information "L6 to C9" is calculated, entropy therefor is calculated and the calculated result is set as standard entropy (step f2).

After the calculation of the standard entropy, three categories "weekday," "afternoon," and "fine weather" which have the highest abstraction degree that satisfies the current state are determined as condition candidates (step f3).

Then, "weekday" is selected first among the condition candidates (step f4), and entropy in a condition candidate that satisfies the route information "L6 to C9" and "weekday" as a condition Cond is calculated (step f5) and is stored (step f7).

Whether any condition candidates other than the already selected condition candidate, "weekend" are present or not among the condition candidates determined in the step f3 is judged (step f6). Herein, the categories "afternoon" and "fine weather" remains. "Afternoon" is selected next (step f4) for performing the same processing.

When the same processing is performed on the remaining category "fine weather" and the processing for all the condition candidates is completed, whether an end condition is satisfied or not is judged (step f8).

Herein, the end condition is judged to be satisfied when either of the following two judgment criteria is satisfied. The first judgment criterion is the case where the standard entropy is the smallest among the entropies for the respective condition candidates and the standard entropy calculated in the step f2. The second judgment criterion is the case where every condition candidate corresponds to any of the categories located at the lowermost level in the hierarchical structure in FIG. 29 with no further concrete category being present. In either cases, the processing terminates to determine the condition selected at the present as an optimum condition (step f9). Assume that the current stage satisfies the end condition, the optimum condition in this case is only the route information "L6 to C9" and no other condition such as date and time is selected.

Suppose herein that the entropy when "afternoon" is selected is the smallest. Then, the entropy value therefor is set as the standard entropy (step f2) and the category "afternoon" is made one-level concrete into "2 a.m. to 3 a.m." so that "weekend," "fine weather," and "2 a.m. to 3 a.m." are determined as new condition candidates (step f3). Subsequently, the same processing is performed on the new condition candidates (steps f4 to f6).

If the end condition is satisfied at this time, the optimum conditions are the route information "L6 to C9" and "afternoon." On the other hand, if the end condition is not satisfied, for example, that the entropy for "weekday" is the smallest, the processing of the steps f2 to f8 are repeated further with the entropy value therefor used as standard entropy until the end condition is satisfied.

For example, when the categories "weekday," "2 a.m. to 3 a.m.," and "fine weather" are determined as the optimum conditions, a transition probability is calculated for only the case where the automobile has traveled along the route "L6 to C9" within the period of "2 a.m. to 3 a.m." on a "weekday" of "fine weather," to determine a transition destination node.

(2)

Another processing example in the condition determination section 107 will be described with reference to the same drawing, FIG. 31. Suppose that the route information until the current time is "L6 to C9," the current node is C9, and the current state includes "Monday," "2 pm.," and "fine weather."

The current node satisfying the route information "L6 to C9" is retrieved from the transition state information indicted in FIG. 5 first (step f1). The node 501 corresponds to this in FIG. 5. Then, likewise the method described above, each provability of transition toward the transition candidate nodes with the condition Cond set to the route information "L6 to C9" is calculated and entropy therefor is calculated to set the calculated result as standard entropy (step f2).

Upon calculation of the entropy, a category one-level concreted from the "ROOT" in the condition category hierarchy in FIG. 29 is determined as a condition candidate (step f3). Specifically, as the condition candidates, "weekday" and "holydays" are set for the date condition, "morning," "afternoon," and "evening" are set for the time condition, and "fine weather," "cloudy weather," and "rainy weather" are set for the weather condition.

The categories into which the condition of day of the week is made concreted, "weekday" and "holydays" are selected among these candidates (step f4); each transition probability and entropy therefor of candidates satisfying the route information "L6 to C9" in the transition state information in FIG. 5 in the case where they are categorized into "weekday" and "holydays" are calculated (step f5); and then, the calculated entropy value is stored (step f7).

Next, the categories into which the time condition is made concreted, "morning," "afternoon," and "evening" are selected (step f4); each transition probability and entropy therefor of candidates satisfying the route information "L6 to C9" in the transition state information in FIG. 5 in the case where they are categorized into "morning," "afternoon," and "evening" (step f5) are calculated; and then, the calculated entropy value is stored (step f7). The same entropy calculation is performed for the weather condition.

Subsequently, the end condition is judged as described above in step f8.

For example, if the entropy in the case where the time condition is made concrete into "morning," "afternoon," and "evening" is the smallest, condition candidates of five categories in total are determined in the next step f3, that is: the category of "weekday" and "holydays"; the category of "fine weather," "cloudy weather," and "rainy weather"; the category into which "morning" is made concrete, "6 a.m. to 7 a.m.," "8 a.m. to 9 a.m.," and "10 a.m. to 11 a.m."; the category into which "afternoon" is made concrete, "12 p.m. to 1 p.m.," "2 p.m. to 3 p.m.," and "4 p.m. to 5 p.m."; and the category into which "evening" is made concrete, "6 p.m. to 7 p.m.," "8 p.m. to 9 p.m.," and "10 p.m. to 11 p.m."

The difference between the above described two kinds of processing lies in that: the former calculates the entropy in only the candidates satisfying the same condition as the current state in the state information such as day of the week, time, and the like in the past travel data indicated in the transition state information in FIG. 5 (for example, when "weekday" is provided as the condition of day of the week because today is Monday, only the entropy in the candidates satisfying "weekday" among the past cases in the same route is calculated.); while the latter calculates the entropy in all the cases in the same route.

It is to be noted that it is thought that the condition categories as in FIG. 29 differ depending on users (for example, some users' holidays are Saturday and Sunday while other users' holidays are Monday and Tuesday.), and therefore, means for acquiring such condition categories may be provided so that each user can utilize different condition categories.

Further, information from start of the current travel to the current position is utilized as a condition in the present embodiment, but other history information in a travel before the current travel (information relating to starting point, route, time and date, and the like) may be reference in addition.

Moreover, it is possible to provide plural kinds of hierarchical structures of condition categories as shown in FIG. 29 for the same key (e.g., time condition). In this case, each entropy in the hierarchical structures is calculated so that each condition is determined, and the prediction is performed under the condition having the smallest entropy among the entropies as a final condition. Whereby, various categories for the layer lower than "afternoon from 12 a.m. to 5 p.m." can be taken into consideration, such as categories of "12 p.m. to 2 p.m.," and "3 p.m. to 5 p.m.," categories of "12 p.m. to 1:30 p.m.," "1:30 p.m. to 3 p.m.," and "4 p.m. to 5 p.m.," in addition to "12 p.m. to 1 p.m.," "2 p.m. to 3 p.m.," and "4 p.m. to 5 p.m." shown in FIG. 29.

Furthermore, the node judgment section 102 judges, upon detection of the position information by the position detection section 101, whether it is a node or not and only a node is accumulated in the history accumulation DB 104 in the present embodiment. However, other constitutions are possible. For example, the position information as detected is accumulated and the node determination section 102 operates at appropriate intervals thereafter for extracting only a node.

It is also possible that the information-to-be-presented determination section 110 determines only the name of a predicted travel destination initially as the information to be presented, and then, the estimated necessary time and other detailed information relating to only the node that the user selects in the presented information is output. Alternatively, a route setting, which is one of the functions of the car navigation system, may be performed with the selected node set as a destination.

It should be noted that means for acquiring information for specifying a user such as a driver and a fellow passenger may be provided further to the constitution of the present embodiment for accumulating history accumulation data for each user. This enables appropriate prediction according to a user and prediction according to difference in fellow passenger even in the case where a plurality of users use the same car navigation system. Various methods are considered as the method of acquiring information for specifying a user. For example, direct input by a user, acquisition of equipment ID, user information, or the like by communication by a user-carrying information terminal, such as a mobile phone and a PDA via radio such as Bluetooth and IrDA, judgment from a car key that stores information for specifying a driver, and person judgment by an on-board camera. No limitation is imposed.

It can be also thought that node information indicating a node name that a user has registered and a node name other than a proper name are stored in the map information DB 103 on a user-by-user basis and the node information to be referenced is changed according to the acquired information for specifying a user. When a node "office" is to be registered, for example, there may be cases where it is "XY Manufacturing Corporation" for a father as a driver and "YZ Trading Corporation" for a son as a driver. Further, it is possible that each user insert his/her memory card storing his/her individual node information into the car navigation system for referencing the map information DB 103 and the memory card. Alternatively, the node information may be stored on a network.

In addition, as the history information stored in the history accumulation DB 104, intersections may be accumulated as nodes, in addition to accumulation of node series, utilizing, for example, information on roads that the automobile has traveled (link connecting between intersections). Specifically, when a road connecting the nodes C8 with C20 is expressed as a link Link(8, 20), the accumulated information such as "L6," "C8," "C20," and "L12" shown in FIG. 3(*c*) is recorded in terms of "L6," "Link(8, 20)," and "L12." A travel destination can be predicted by the same method as in the present embodiment even in the case where the travel history is accumulated in such terms.

Second Embodiment

Figure 8:
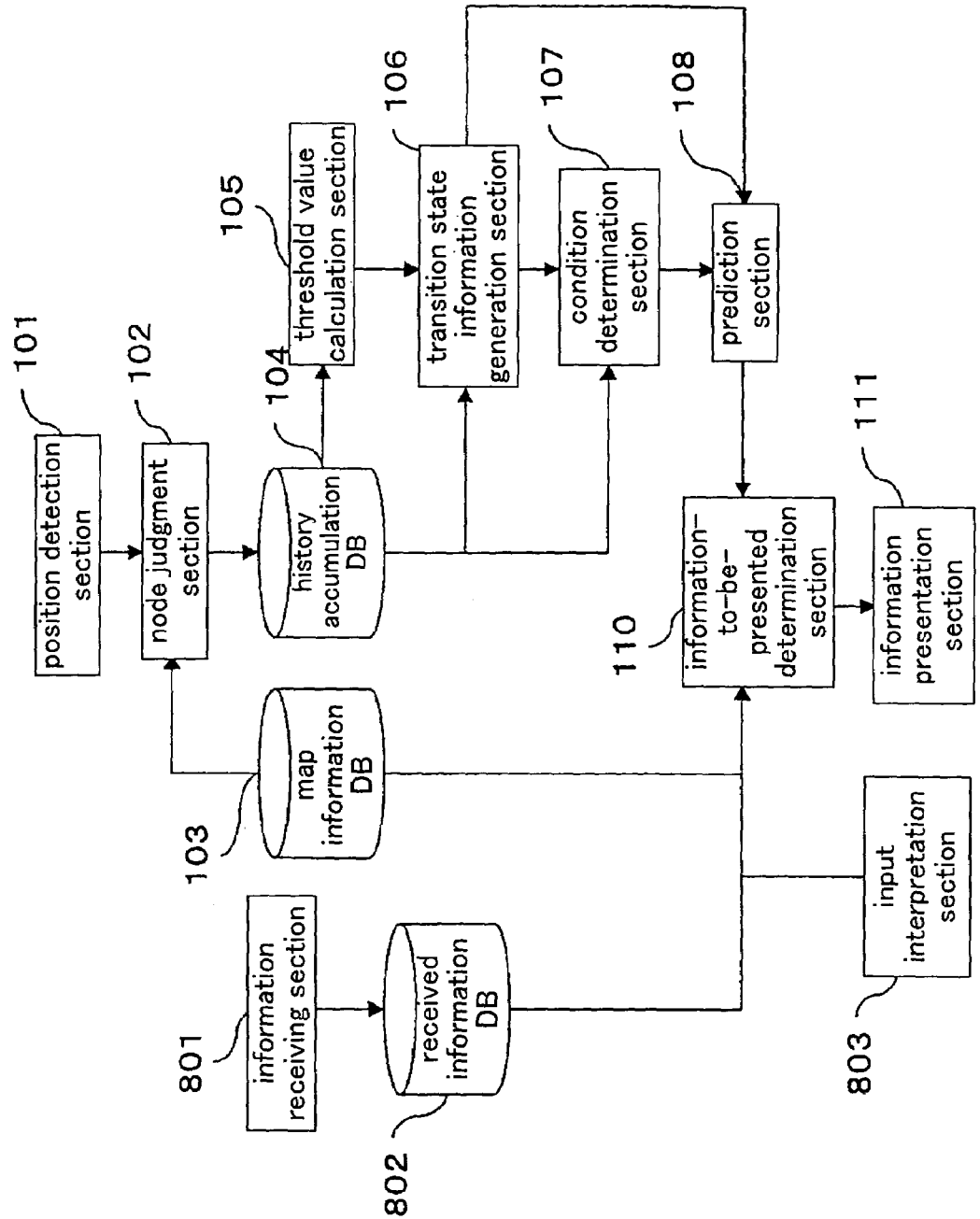
FIG. 8 is a drawing showing a constitution of an information acquisition system according to the second embodiment of the present invention.

FIG. 8 shows a constitution of a car navigation system as an information acquisition system according to the second embodiment of the present invention. Detailed description is omitted about elements operating in the same manner as the operation of those in the first embodiment among the elements to which the reference numerals common to those in FIG. 1 are assigned in FIG. 8.

In FIG. 8, reference numeral 801 denotes an information receiving section that receives information from outside via a network, a broadcast wave, or the like, and 802 denotes a received information DB that accumulates information that the information receiving section 801 receives. Also, reference numeral 803 denotes an input interpretation section that interprets an input from a user upon receipt. The information-to-be-presented determination section 110 determines information to be presented to a user relating to a travel destination predicted by the prediction section 108 by referencing the map information DB 103, the received information DB 802, and the interpretation of the input interpretation section 803.

FIG. 9 indicates one example of the information stored in the map information DB 103. In the present embodiment, as shown in FIG. 9, information relating to genres to which the respective nodes belong is stored in the map information DB 103, in addition to the information indicating the position and the name of each node as shown in FIG. 2 (not shown in FIG. 9). For example, a node ID "L3" has a name "C Co-op" and belongs to a genre "supermarket."

FIG. 10 indicates one example of the information received by the information receiving section 801 and accumulated in the received information DB 802. In the example of FIG. 10, there are accumulated: information indicating positions such as names, latitudes/longitudes and the like of landmarks and areas that have information; detailed relating information; and other information such as image, video and the like. Addresses and the like may be used as information indicating the positions, besides the latitudes/longitudes.

Figure 11:
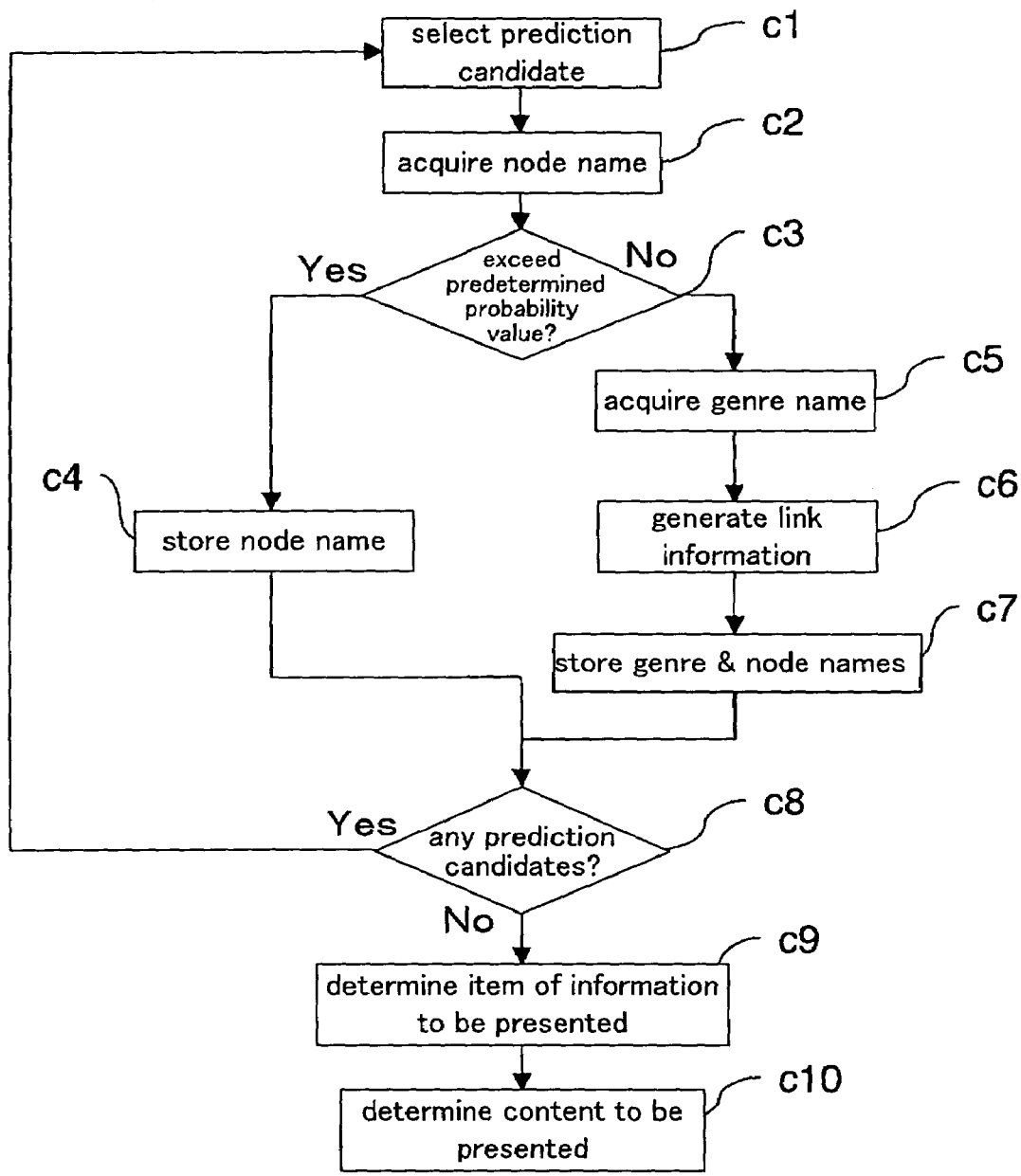
FIG. 11 is a flowchart depicting operation of an information-to-be-presented determination section in the second embodiment of the present invention.

The operation of the information-to-be-presented determination section 110 in the present embodiment will be described next with reference to the flowchart of FIG. 11. Wherein, the prediction section 108 in the present embodiment predicts a plurality of travel destinations and obtains the respective prediction probabilities thereof, as shown in FIG. 12.

First, one of the nodes predicted by the prediction section 108 is selected as a prediction candidate (step c1), and the name of the selected node is retrieved from the map information DB 103 (step c2). Herein, a node "L131" is selected from the nodes indicated in FIG. 12, and "Kametani Golf Shop" is acquired as the name of the node "L131."

Subsequently, whether the prediction probability that the automobile might advance for the node selected in the step c1 exceeds a predetermined value or not is judged (step c3). In the present embodiment, the predetermined value is set to be "0.25." The prediction probability of the node "L131" at this time is 0.31, which exceeds the predetermined value, so that the node name "Kametani Golf Shop" is stored as a candidate for information to be presented (step c4).

If a node of the prediction candidate other than "L131" is present (Yes in step c8), a next candidate "L18" is selected (step c1) and the name of the node is retrieved to acquire the name "Bonjour" (step c2). "L18" has a prediction probability of 0.26, which exceeds the predetermined value, so that the node name "Bonjour" is stored as well as "L131."

"L3" is selected as a next candidate (step c1), to acquire the name "C Co-op" (step c2). The probability value thereof is 0.18, which does not exceed the predetermined value (No in step c3), so that "supermarket," which is the genre name of the node "L3," is acquired by referencing the map information DB 103 (step c5). Then, link information connecting between the genre "supermarket" and the name "C Co-op" of the node "L3" is generated (step c6), and the genre name and the node name are stored as a candidate for information to be presented. (step c7).

The same processing is performed on the remaining node "L52." As a result of the processing, items of the information to be presented as indicated in FIG. 13 are determined (step c9). When the items of the information to be presented are determined in this way, information corresponding to the items is retrieved by referencing the received information DB 802 to determine the contents to be presented (step c10).

Figure 14:
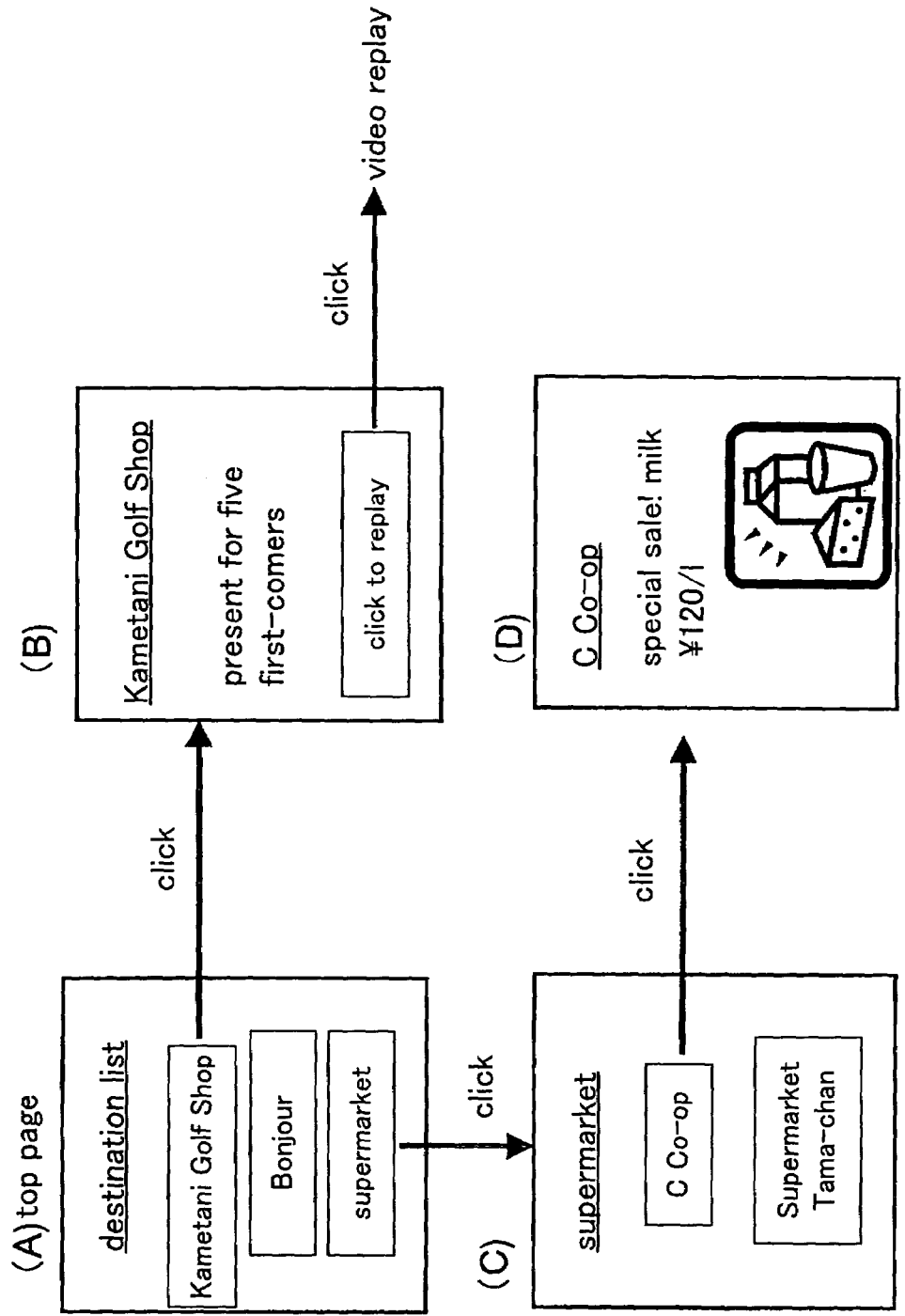
FIG. 14(A) to FIG. 14(D) are drawing showing examples of the information to be presented.

FIG. 14 shows an example of information determined by the information-to-be-presented determination section 110 and presented by the information presentation section 111. The presented information is structured so as to be able to follow the links of FIG. 14(B) or FIG. 14(C) and FIG. 14(D) from the top page of FIG. 14(A). When an input specified by a user is interpret in the input interpretation section 803, the information on a linked end is presented accordingly. Further, in the screens displaying shops shown in FIG. 14(B) and FIG. 14(D), image or video information is replayed as information accumulated in the received information DB 802, in addition to the text information.

Figure 15:
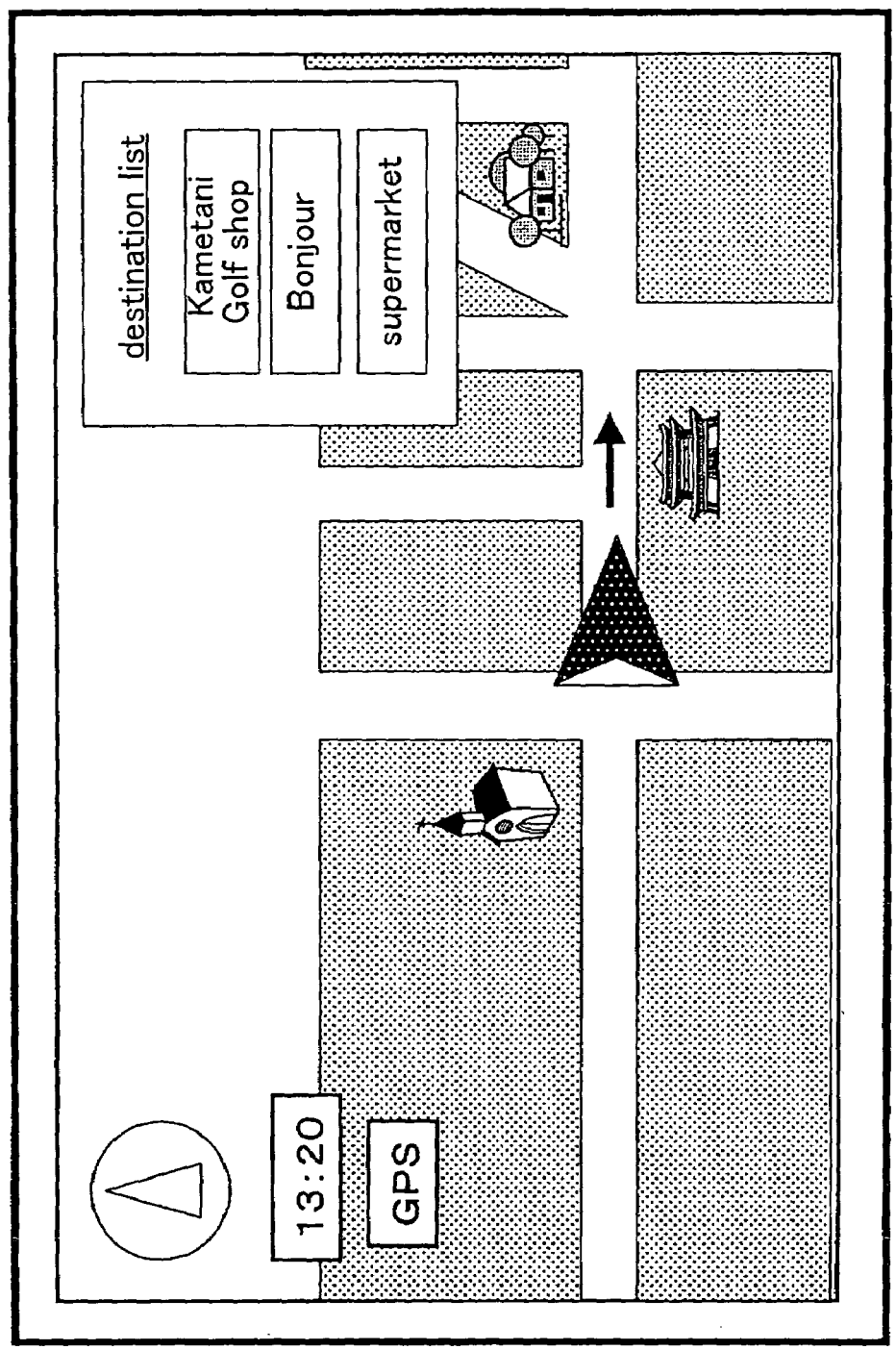
FIG. 15 is a drawing illustrating a screen example which presents information to a user.

FIG. 15 shows an example where such information is presented to a user on a screen of the car navigation system. The names "Kametani Golf Shop" and "Bonjour" as the travel destinations "L131" and "L18" having the prediction probabilities exceeding the predetermined value, and the genre name "supermarket" as the travel destinations "L3" and "L52" having the prediction probabilities not exceeding the predetermined value are determined as the information to be presented and are presented. In this way, a candidate destination having not so high prediction probability is presented as a genre, thereby reducing possibility of rendering a user annoyed by presenting wrong predicted destination.

It is noted that other aspects of information presentation are possible. For example, for the nodes having prediction probabilities exceeding the predetermined value, such as "Kametani Golf Shop," "Bonjour," not only the items but also detailed information relating thereto are displayed in the top page while only the items are presented for the other nodes. Alternatively, only the genres may be displayed in the top page regardless of their prediction probabilities. Further, the names (landmark names, area names, and the like) of all the nodes may be displayed rather than the genres.

Display may be changed according to whether a landmark to be presented is the user's destination or is on the predicted travel route. For example, the node name and the genre name may be displayed for the destination and the node on the route, respectively.

Moreover, as described in the first embodiment, prediction of a travel destination node by the prediction section 108 naturally enables prediction of the route up to the node.

Hence, commercial information relating to a landmark existing in the vicinity of the predicted route may be presented in addition to the commercial information relating to the predicted node (landmark).

Furthermore, as the information to be presented, information on the necessary time described in the first embodiment or information relating to the predicted destination accumulated in the map information DB 103 may be represented.

Third Embodiment

Figure 16:
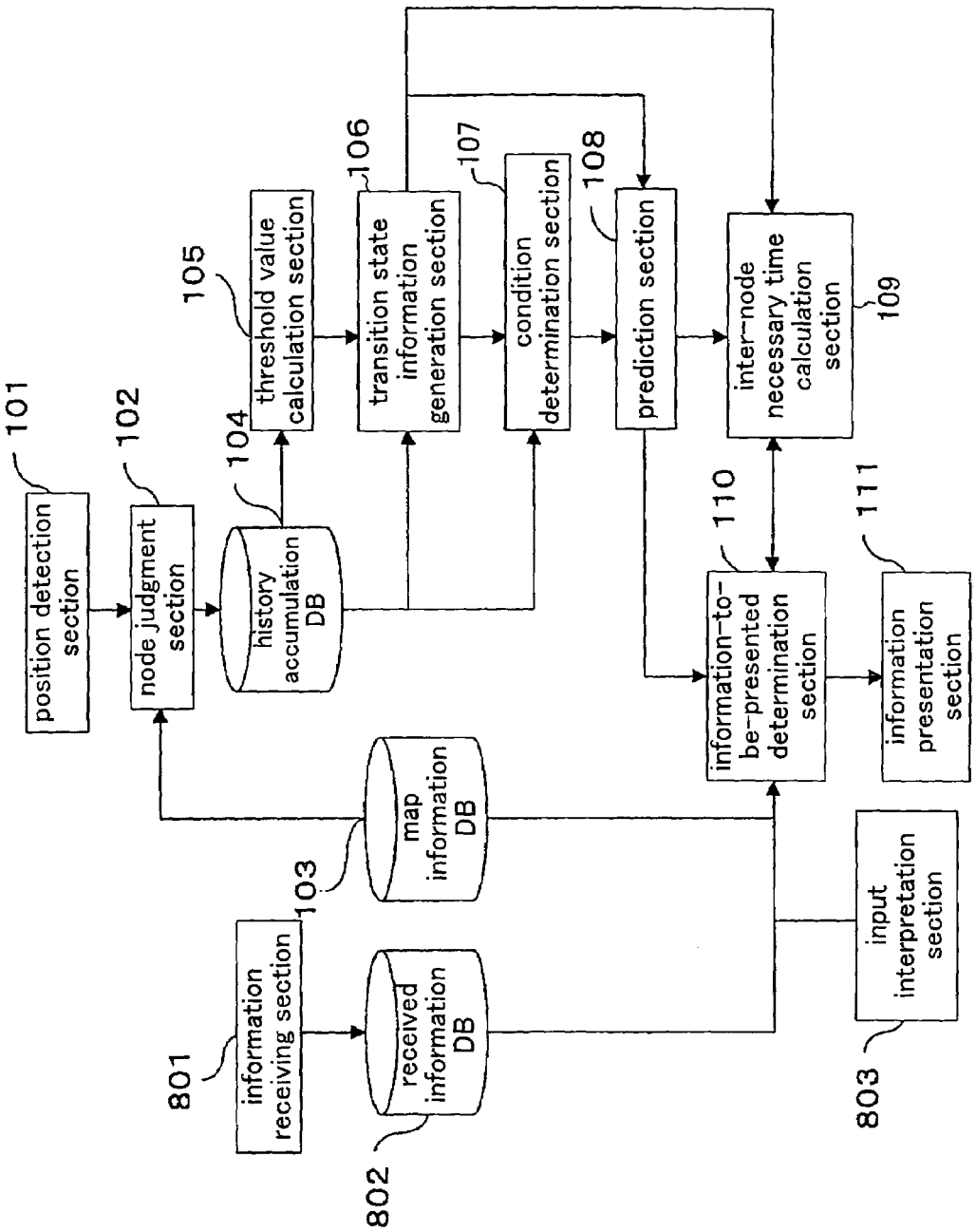
FIG. 16 is a drawing showing a constitution of an information acquisition system according to the third embodiment of the present invention.

FIG. 16 shows a constitution of a car navigation system as an information acquisition system according to the third embodiment of the present invention. Detailed description is omitted about elements operating in the same manner as the operation of those in the first and second embodiments among the elements to which the reference numerals common to those in FIG. 1 and FIG. 8 are assigned in FIG. 16.

Herein described will be each operation of the information receiving section 801, the received information DB 802, the prediction section 108, the inter-node necessary time calculation section 109, and the information-to-be-presented determination section 110.

The information receiving section 801 receives information relating to road/traffic by utilizing a network, a broadcast wave or the like, and the received information DB 802 accumulates the received road/traffic information.

The prediction section 108 predicts one or more travel destination nodes, and then, predicts each node transition series from the current node to the predicted node(s), that is, one or more travel routes.

The inter-node necessary time calculation section 109 calculates a necessary time required for transferring between the current node and a predicted node (destination of the current travel). For example, as described in the first embodiment, an average value of past travel times for transferring between the current node and the predicted destination node is calculated as an estimated necessary time by referencing the transition state information generated by the transition state information generation section 106. Wherein, the necessary time may be obtained after further narrowing the object of retrieval under a condition such as date, time and the like. Or, in the case where information not indicated in the transition state information is stored in the history accumulation DB 104, the necessary time may be calculated by referencing the history accumulation DB 104. Processing other than the above examples is possible. For example, it is possible to calculate an average travel time between two arbitrary nodes included in the travel route predicted by the prediction section 108 among two or more nodes that the information-to-be-presented determination section 110 selects upon receipt of the information of the received information DB 802 and of the map information DB 103.

The information-to-be-presented determination section 110 selects two or more nodes to be sent to the inter-node necessary time calculation section 109 by referencing the received information DB 802 and the map information DB 103. Also, it determines information to be presented to the user by referencing the route information predicted by the prediction section 108, the estimated necessary time between the given nodes which is calculated by the inter-node necessary time calculation section 109, and the route/traffic information accumulated in the received information DB 802.

Figure 17:
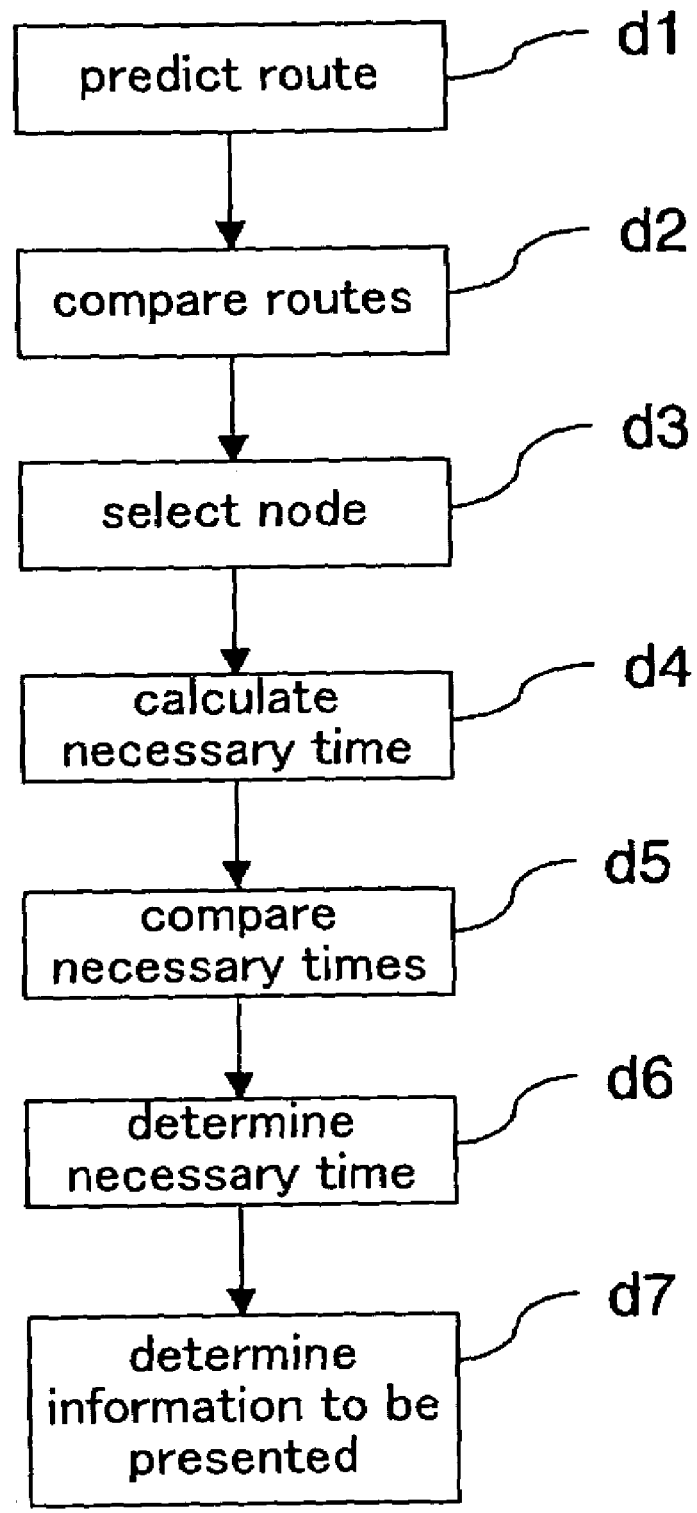
FIG. 17 is a flowchart depicting a processing flow in the third embodiment of the present invention.

The processing flow in the present embodiment will be described with reference to the flowchart of FIG. 17.

First, the prediction section 108 predicts one or more route information (step d1). FIG. 18 shows one example of the predicted route information. The number of pieces of the route information may be plural as in FIG. 18 or only one.

Upon prediction in the step d1, the information-to-be-presented determination section 110 compares the road/traffic information accumulated in the received information DB 802 with the predicted route information as shown in FIG. 18 to judge whether the road/traffic information relating to the predicted route is present or not (step d2). FIG. 19 shows a concrete example of the road/traffic information. As shown in FIG. 19, the road/traffic information herein includes items such as road names, sections, and relating information. The elements composing section information are stored in the map information DB 103, as referred to in FIG. 2.

The judgment method herein will be described. The information-to-be-presented determination section 110 first converts the section information of the road/traffic information as indicated in FIG. 19 into the node expression by referencing the map information DB 103. For example, section information of "Sumoto-kita to Sumoto-minami" is converted into the node information of "C13 to C20." Next, whether there are sections agreeing with the converted node information or not is judged by comparing the converted node information with the predicted route information in FIG. 18. The result of this judgment indicates that the route with priority number 1 includes "C13 to C20." In other words, the step d2 results in selection of the section "C13 to C20" (step d3).

Subsequently, the inter-node necessary time calculation section 109 calculates, by referencing the transition state information, an average necessary time required for traveling the route with the priority number 1 in the past (hereinafter referred to as route average necessary time), and an average necessary time required, in the past, for traveling between the nodes "C13 to C20" selected by the information-to-be-presented determination section 110 (hereinafter referred to as section average necessary time) (step d4). Suppose herein that the route average necessary time and the section average necessary time are calculated to be "80 minutes" and "20 minutes," respectively.

Next, the information-to-be-presented determination section 110 compares the necessary time, "30 minutes" of the section corresponding to "C13 to C20" accumulated as relating information in the received information DB 802 with the section average necessary time, "20 minutes" calculated by the inter-node necessary time calculation section 109 to calculate a differential time, "10 minutes" (step d5). Then, the differential time, "10 minutes" and the route average necessary time, "80 minutes" are factored to determine "90 minutes" as predicted necessary time (step d6).

The information-to-be-presented determination section 110 further performs conversion from the node number to the name of a landmark or the like by referencing the map information DB 103 to determine the information to be presented to the user (step d7).

Figure 20:
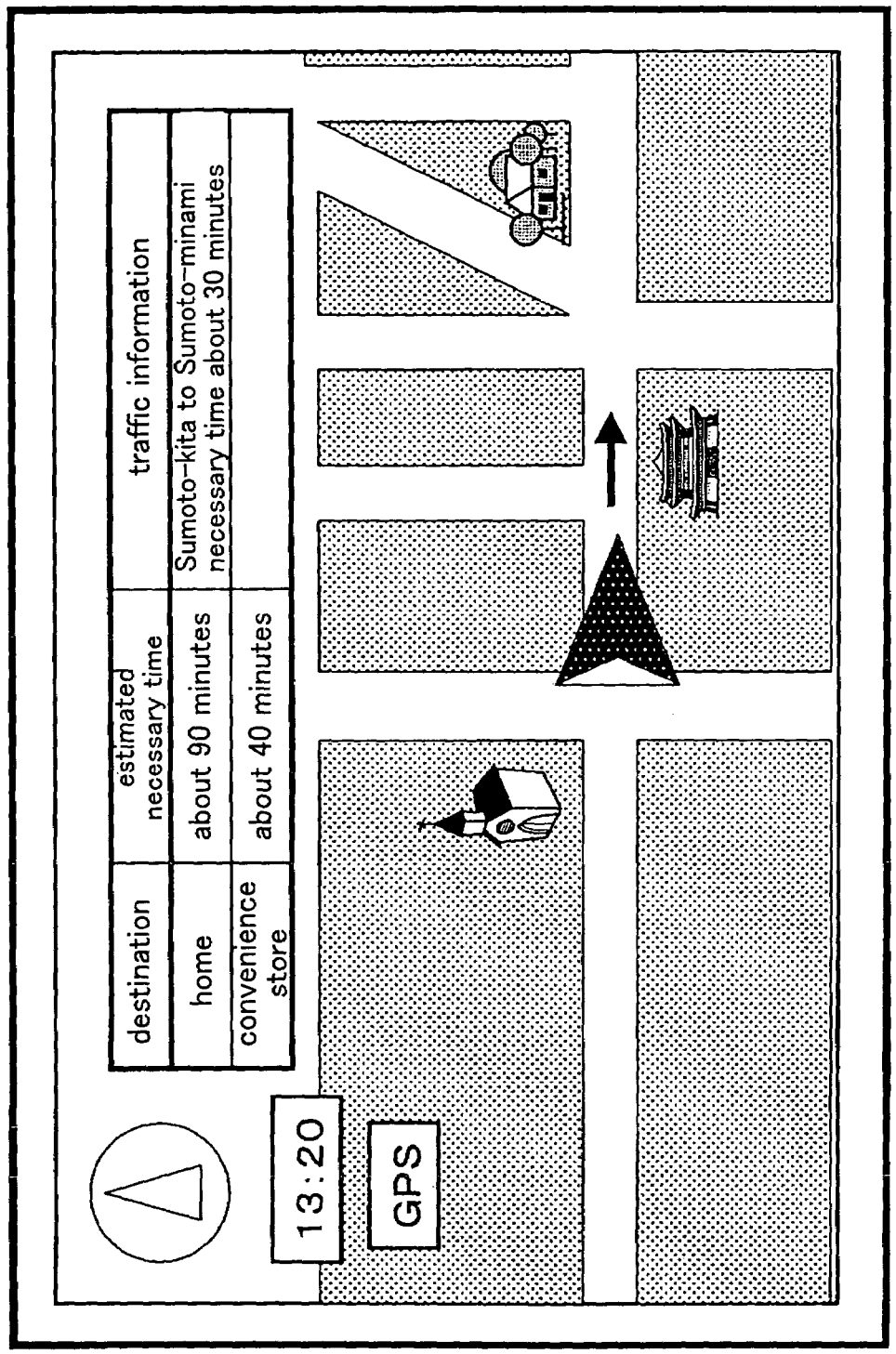
FIG. 20 is a drawing illustrating a screen example which is presented to a user.

FIG. 20 shows an example of a screen that the information presentation section 111 presents to the user. In FIG. 20, the screen displays: the names of the predicted destinations; the estimated necessary time obtained by referencing the road/traffic information; and the received road/traffic information.

It is to be noted that the aspect of the presented information is not limited to those referred to herein, and only the road/traffic information relating to the predicted route may be presented. This eliminates the need of the inter-node necessary time calculation section 109.

Developmental Example

Figure 21:
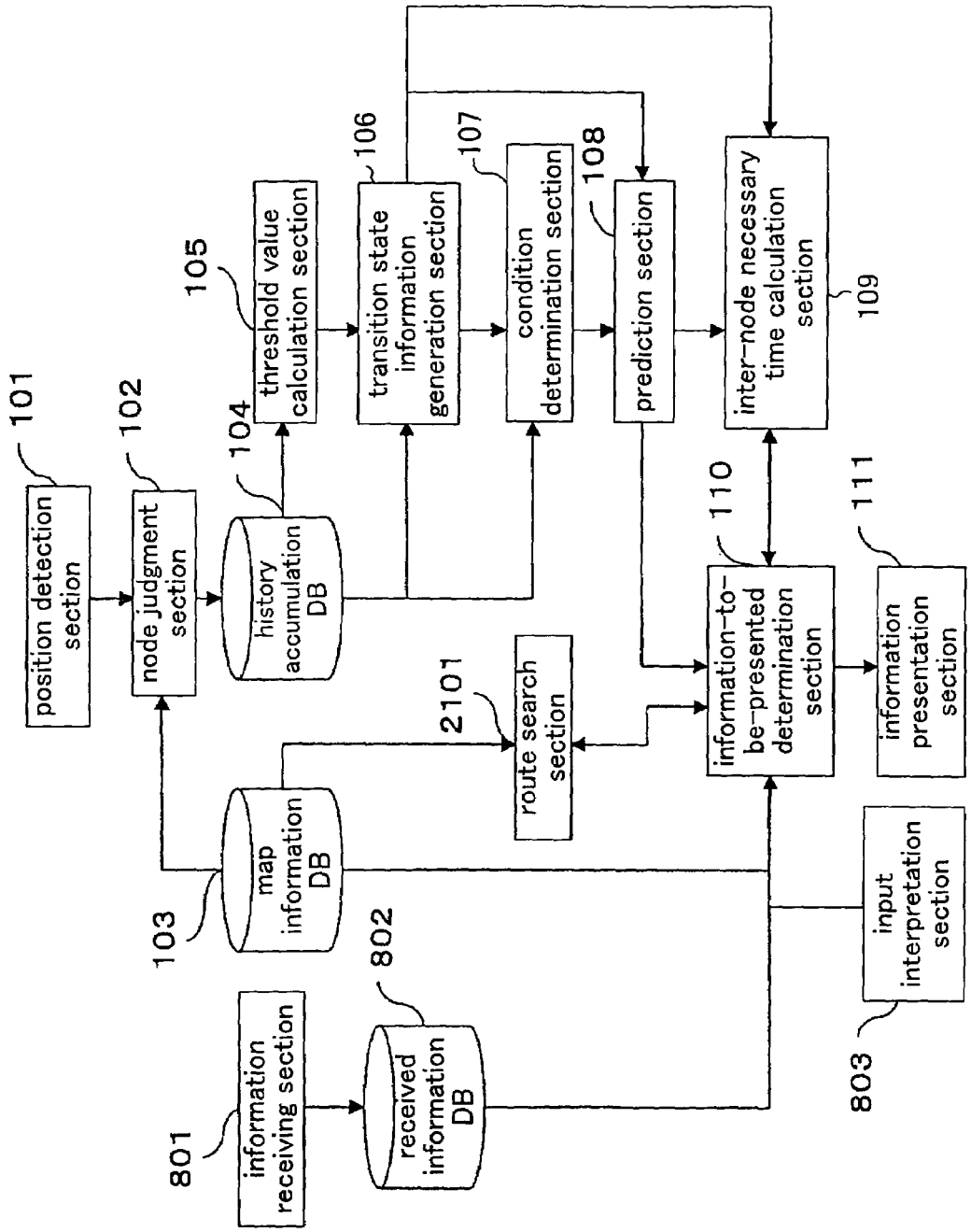
FIG. 21 is a drawing showing a constitution of an information acquisition system in a developmental example of the third embodiment of the present invention.

The constitution shown in FIG. 21 can be considered as an example attained by developing the aforementioned third embodiment. In FIG. 21, a route search section 2101 is provided, different from that in FIG. 16.

Operation of the route retrieval section 2101 will be described. When it is judged in the necessary time comparison step d5 or necessary time determination step d6 that longer time is required than the past average necessary time in the route predicted to be a route along which the automobile will advance, the route search section 2101 receives, from the information-to-be-presented determination section 110, the predicted route information indicated in FIG. 18 and information read out from the received information DB 802, while searching a route of which necessary time is shorter than that of the predicted route by referencing the map information DB 103. The algorithm for the search is not limited and the detailed description thereof is omitted here. When the route in which necessary time is shorter than that in the predicted route is hit in the search, the information presentation section 111 presents the information relating to the hit route to the user.

Further, the route search section 2101 may search, with priority, a route which the user has traveled in the past and in which necessary time is further shorter by referencing the history accumulation DB 104, the transition state information, or the inter-node necessary time calculation section 109.

The other route may be searched not only when the constraint on the necessary time described as above is not satisfied but also when there is regulation information relating to the predicted route, such as closure.

Fourth Embodiment

Figure 22:
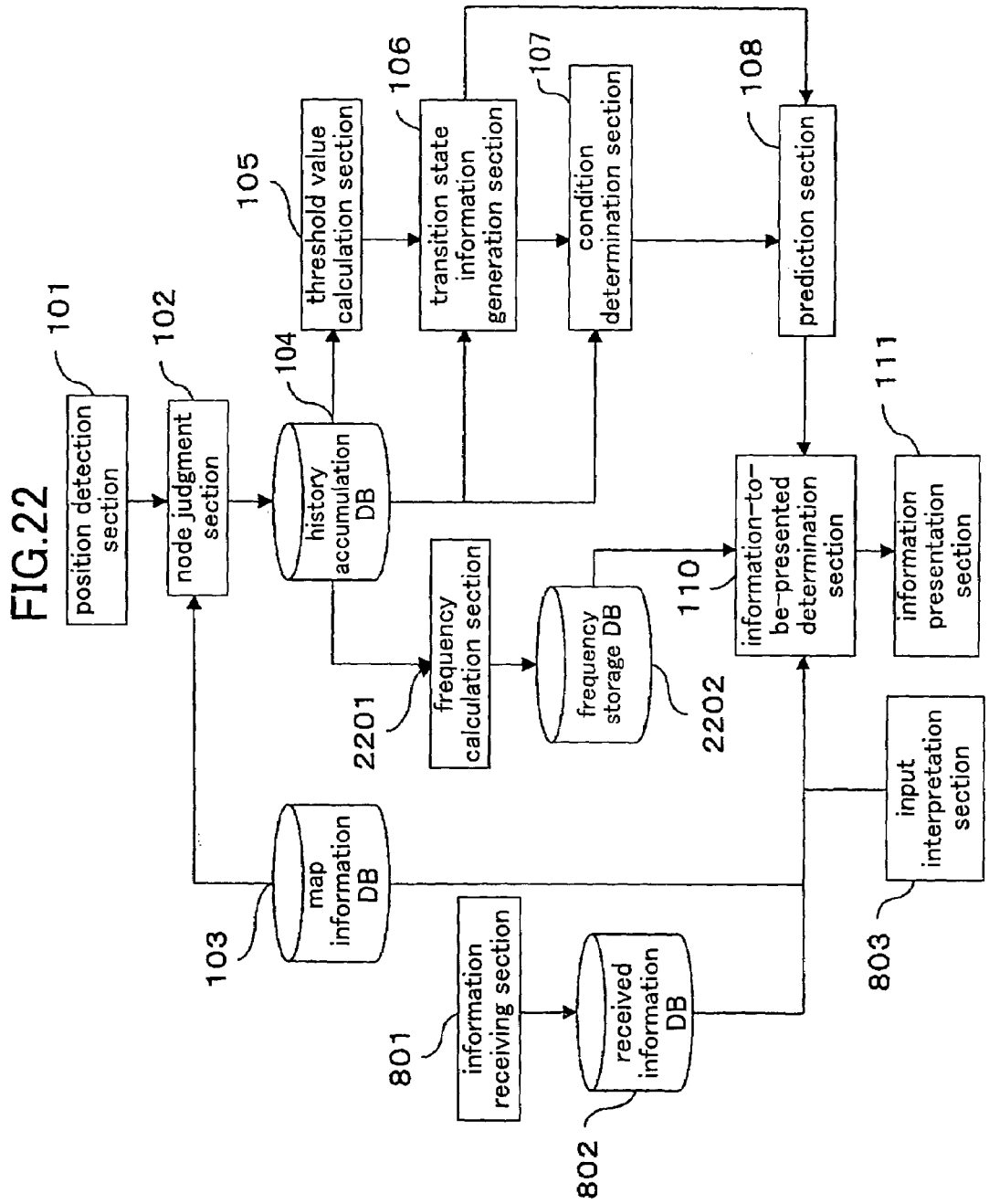
FIG. 22 is a drawing showing a constitution of an information acquisition system according to the fourth embodiment of the present invention.

FIG. 22 shows a constitution of a car navigation system as an information acquisition system according to the fourth embodiment of the present invention. Detailed description is omitted about elements operating in the same manner as the operation of those in the second embodiment among the elements to which the reference numerals common to those in FIG. 8 are assigned in FIG. 22.

Reference numeral 2201 denotes a frequency calculation section that calculates each frequency of appearance at the nodes (landmark, area) where the user has made a stop in the travel history, and 2202 denotes a frequency storage DB for storing the frequency calculated by the frequency calculation section 2201.

Figure 23:
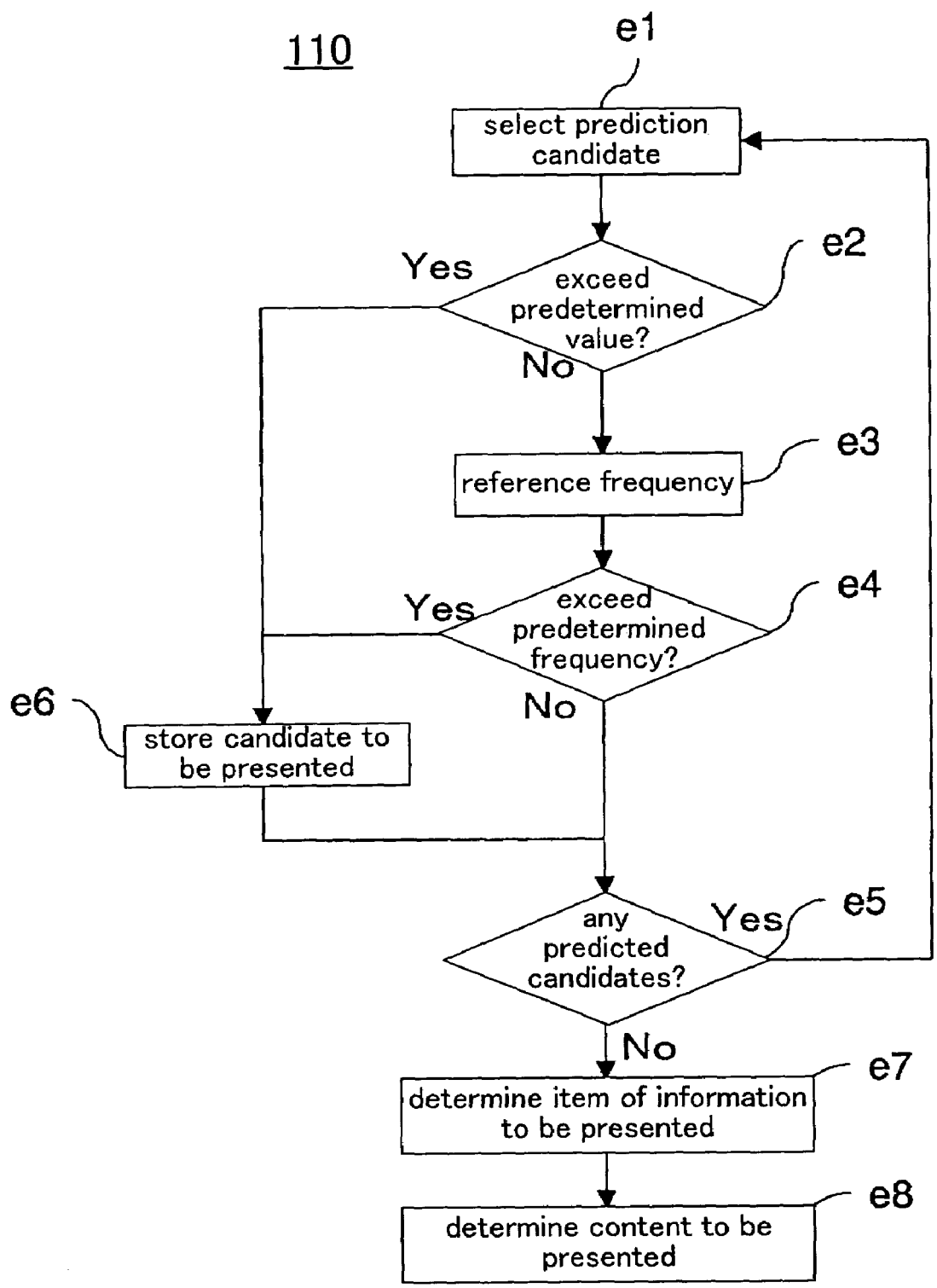
FIG. 23 is a flowchart depicting operation of a information-to-be-presented determination section in the fourth embodiment of the present invention.

FIG. 23 is a flowchart depicting operation for determining information to be presented by the information-to-be-presented determination section 108.

The information-to-be-presented determination section 110 selects one among the predicted travel destinations as a prediction candidate (step e1) upon receipt of the result of prediction as indicated in FIG. 12 from the prediction section 108, and then, references the prediction probability of the selected prediction candidate (step e2). When the prediction probability exceeds a predetermined value, the prediction candidate is stored as a candidate to be presented to the user (step e6). On the other hand, when the probability value does not exceed the predetermined value, the frequency of this prediction candidate is acquired by referencing the frequency storage DB 2202 (step e3). This prediction candidate is stored as a candidate to be presented to the user when the acquired frequency exceeds a predetermined value (step e6), otherwise it is not stored. Then, any other prediction candidates are searched (step e5), and the same operation is repeated when there is any prediction candidate.

When the processing for all the predicted candidates is completed, information relating to the stored candidates to be presented as the predicted destinations is determined as items to be presented (step e7), and information relating thereto is determined as a content to be presented by referencing the map information DB 103 or the received information DB 802 (step e8).

It is to be noted that various methods as the method of determining a candidate to be presented are thought other than the method mentioned above. For example, in a case employing the frequency, a criterion as to whether a rate of the frequency of a predicted candidate node which occupies the total frequency of landmarks and areas where the user has been in the past exceeds a predetermined value may be used rather than setting the criterion as to whether the frequency exceeds the predetermined value as a condition for candidate representation. Alternatively, it is possible that the frequency storage DB 2202 stores frequencies on a per genre basis as indicated in the second embodiment and the frequency of a genre as a whole to which the node belongs is used as a criterion for judgment rather than the frequency of a single predicted candidate node. In addition, each prediction candidate may be judged taking account of both the prediction probability obtained by the prediction section 108 and the frequency stored in the frequency storage DB 2202 as criteria.

Fifth Embodiment

Figure 24:
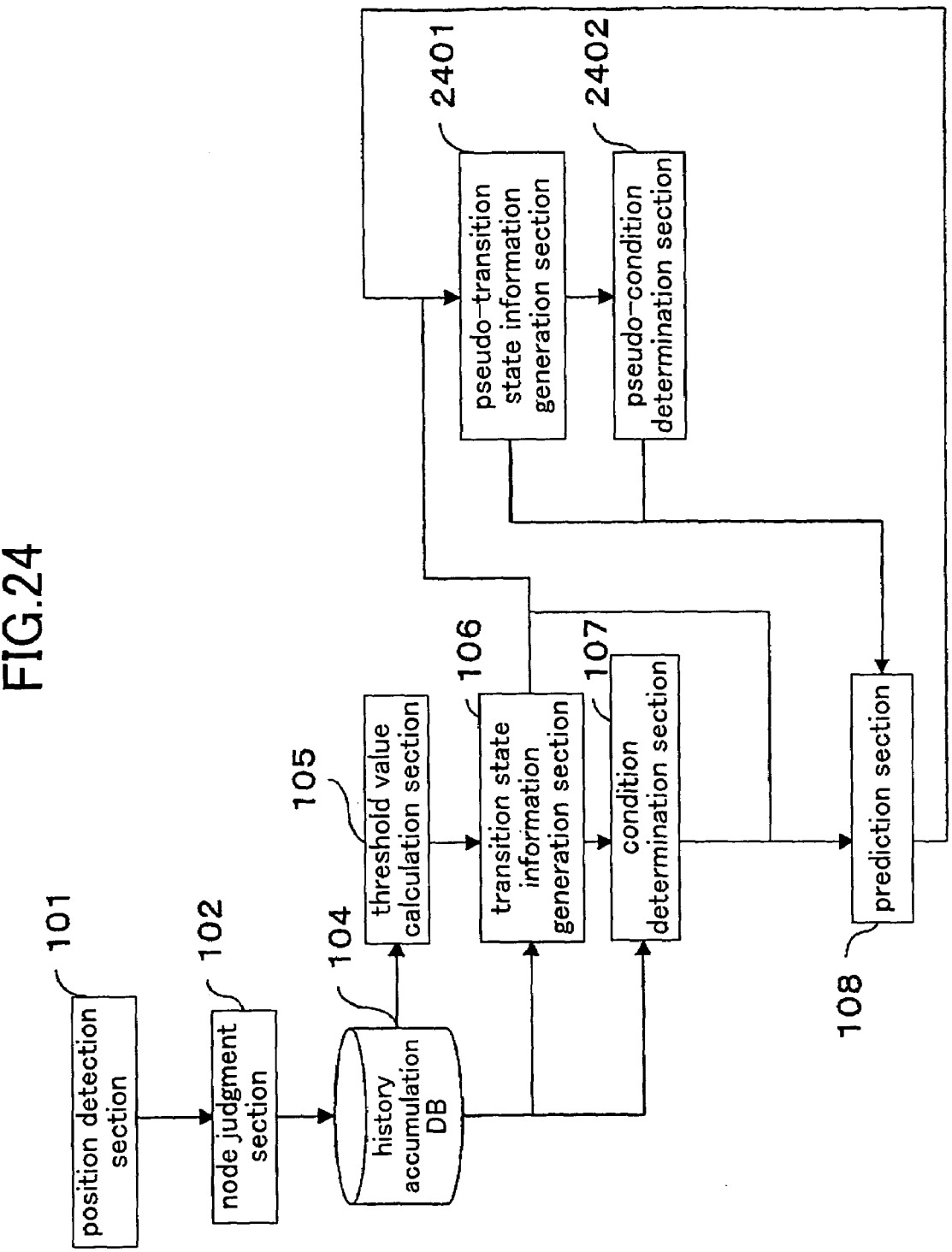
FIG. 24 is a drawing showing a constitution of an information acquisition system according to the fifth embodiment of the present invention.

FIG. 24 shows a constitution of a car navigation system as an information acquisition system according to the fifth embodiment of the present invention. Detailed description is omitted about elements operating in the same manner as the operation of those in the aforementioned embodiments among the elements to which the reference numerals common to those in FIG. 1 are assigned in FIG. 24.

Reference numeral 2401 denotes a pseudo-transition state information generation section that generates, upon determination of the predicted destination by the prediction section 108, pseudo-transition state information after a travel from the current transition state information and the predicted result, likewise the first embodiment, under a hypothesis that the user would have traveled as predicted. Reference numeral 2402 denotes a pseudo-condition determination section that determines a pseudo-condition for retrieval from the pseudo-transition state information generated by the pseudo-transition state information generation section 2401, likewise the first embodiment.

Of the two types of operation described in the first embodiment with reference to the category hierarchy of FIG. 29, information relating to the state at departure from the predicted travel destination (day of the week, time, weather, and the like) is necessary for allowing the pseudo-condition determination section 2402 to perform the former operation. Alternatively, when the pseudo-condition determination section 2402 performs the latter operation, such state information is unnecessary in the pseudo-condition determination 2402 but is necessary in the prediction section 108.

The following method is considered as the method of acquiring the above information. Retrieval on the history accumulation DB 104 can lead to calculation of an average of time periods (hereinafter referred to as stopover periods) spent until the automobile departs from a predicted travel destination (target destination) in the case where the automobile arrives at the target destination from the current position. If the average stopover period is factored in the estimated arrival time at which the automobile arrives at the predicted travel destination, states about the day of the week, time, and the like at departure from the predicted travel destination can be acquired.

When variance in the stopover periods is large in calculating an average stopover period by retrieval on the history accumulation DB 104, the reliability of the average value is lowered. In this case, the stopover periods are divided into several small groups of variance, respective average values of the groups are calculated as stopover period candidates, and then, pseudo-condition determination or prediction is performed on all the candidates.

It is noted that in the case where the state of departure from the predicted target destination is alienated from the state information acquired in advance, the usual prediction processing as described in the first embodiment is performed afresh.

Usually, it takes time to complete the processing in the transition state information generation section 106 and the condition determination section 107. For this reason, it takes too much time to present information if the series of processing in which: the current position is detected; the travel history is updated; the latest transition state information is generated; and an optimum condition for retrieval is determined is performed at start of the automobile engine, for example. In short, it is difficult to present information relating to a predicted target destination immediately after the user starts the engine.

In this connection, when user's travel destination or travel route is predicted in the middle of a certain travel, the following processing is performed in advance before the user initiates behavior for departing from the predicted travel destination (e.g., starting engine, opening automobile doors, and the like).

Namely, pseudo-transition state information at engine start for a next travel, in detail, at engine start at the currently predicted target destination, is generated by the pseudo-transition state information generation section 2401, and the condition for retrieval at that time are determined by the pseudo-condition determination section 2402. This enables prediction completion within a short period of time when the engine starts for the next travel, with a result that necessary time information relating to the predicted target destination (a new travel destination or travel route) and other relating information can be presented to the user quickly.

The prediction using the pseudo-transition state information and the pseudo-condition can be performed not only at engine start but also any timing when advanced prediction is desired.

In addition, as the timing of generation of the pseudo-transition state information, of determination of the pseudo-condition, or of pre-prediction using them, other timing is considered such as timing when a value of the probability that the automobile might travel toward a predicted travel destination exceeds a predetermined threshold value.

Further, a constitution without providing the pseudo-transition state information generation section 2410 and the pseudo-condition determination section 2402 can be considered as a constitution other than that in FIG. 24. With this constitution, the latest transition state information and a condition for retrieval which are already generated at the time of prediction by the prediction section 108 are used rather than the pseudo-transition state information and the pseudo-condition.

Referring to the information to be presented and the prediction method, any of those described in the above embodiments is employable. As timing of presentation of such information, presentation in an initial screen at power-on of the car navigation system is effective, but information may be presented in a screen appearing after the initial screen. Moreover, presentation of information on a target destination candidate predicted to be a destination in a next travel and on the necessary time required for arriving thereat, and traffic information on the route, which serve as indexes of next departure time for arriving at the target destination in time, is greatly effective for users. In this connection, a target destination candidate, estimated arrival time, and traffic information on the assumption that the automobile starts at as-estimated departure time calculated by the above described method may be displayed, for example. Further, if information relating to an average stopover period at a node can be acquired, it is possible to display a target destination candidate, estimated arrival time, and traffic information in every departure time when each 30-minute or one-hour interval elapses since the average stopover period as a reference elapses.

Travel end can be detected by detecting a state such as a state where the automobile does not move for a long time at a target destination, a state where the gear is shifted into parking, a state where the emergency brake is yanked, and the like.

Sixth Embodiment

Figure 25:
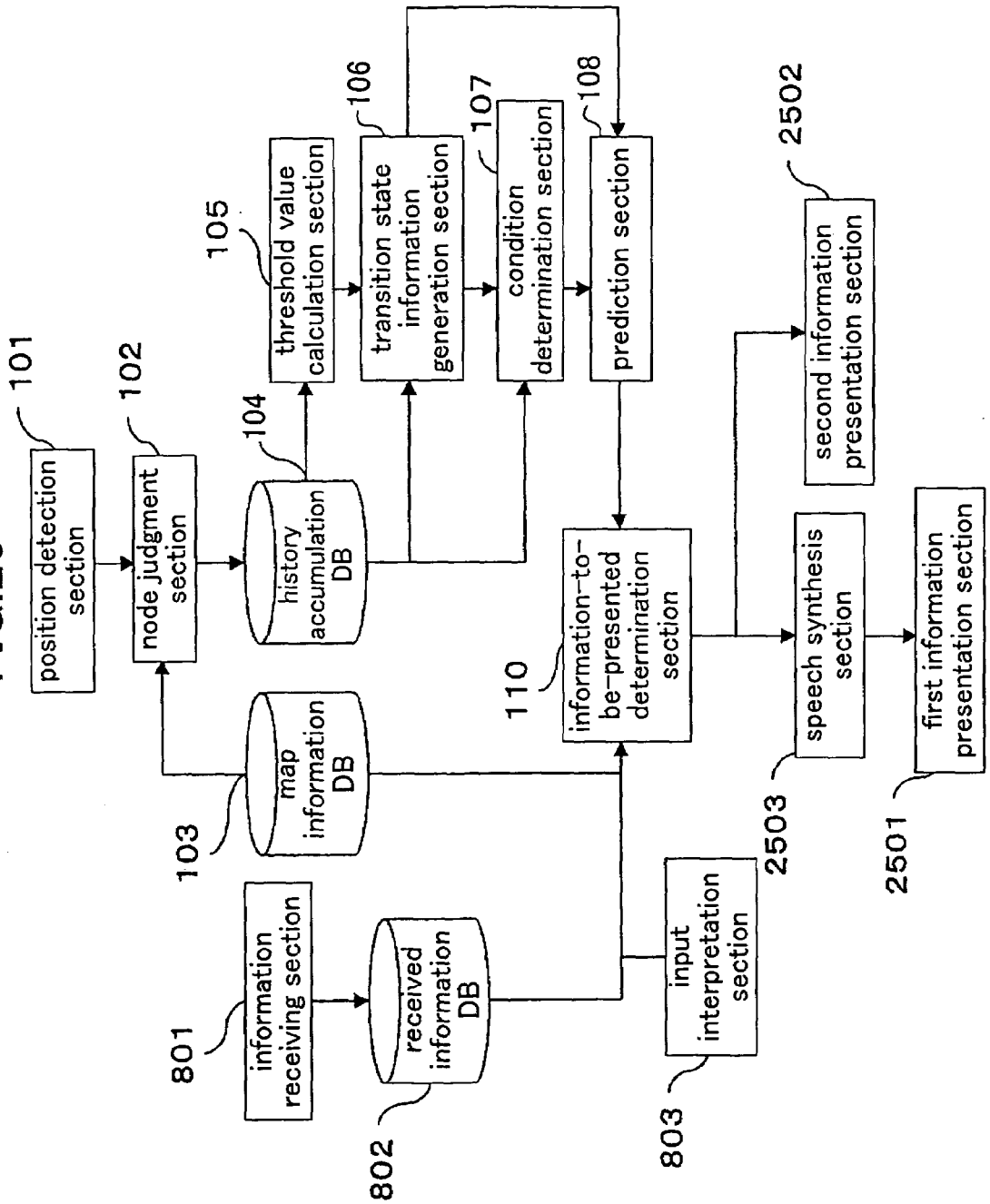
FIG. 25 is a drawing showing a constitution of an information acquisition system according to the sixth embodiment of the present invention.

FIG. 25 shows a constitution of a car navigation system as an information acquisition system according to the sixth embodiment of the present invention. Detailed description is omitted about elements operating in the same manner as the operation of those in each of the above embodiments among the elements to which the reference numerals common to those in FIG. 8 are assigned in FIG. 25.

In FIG. 25, the information-to-be-presented determination section 110 receives the result of prediction by the prediction section 108, and determines information relating to the predicted travel destination and the like among the information accumulated in the received information DB 802 as information to be presented, likewise the above described embodiments. In the present embodiment, a cognitive load of a user to whom the information is presented is taken in account further in determining the information to be presented.

Reference numeral 2501 denotes a first information presentation section that performs information presentation to a user carrying a high cognitive load, such as a driver; 2502 denotes a second information presentation section that performs information presentation to a user carrying a not-so-high cognitive load compared with the driver, such as passengers occupying the front seat and the rear seat; and 2503 is a speech synthesis section that generates data for outputting via voice the information to be presented determined by the information-to-be-presented determination section 110. The first information presentation section 2501 also presents speech information synthesized by the speech synthesis section 2503, together with text/image information determined to be presented by the information-to-be-presented determination section 110. On the other hand, the second information presentation section 2502 presents text/image information determined to be presented by the information-to-be-presented determination section 110.

Suppose that the prediction section 108 predicts "F-Mart" as a travel destination and the received information DB 802 accumulates information as indicated in FIG. 26. on "F-Mart."

The information-to-be-presented determination section 110 determines respective information to be presented to the first and second information presentation sections 2501, 2502 based on the information in FIG. 26, in accordance with a given rule. The given rule may be, for example, "to present index information via voice to a user carrying a high cognitive load while presenting it to a user carrying a low cognitive load together with detailed topics and an image or video." In accordance with the rule, the information-to-be-presented determination section 110 determines to present speech information on "Bargain Information", which is index information in FIG. 26, as an output to the first information presentation section 2501 and to present image information including the detailed topics in FIG. 26 and other information as an output to the second information presentation section 2502.

FIG. 27(A) and FIG. 27(B) shows examples of information presentation by the first information presentation section 2501 and information presentation by the second information presentation section 2502, respectively. Referring to the example in FIG. 27(A), the detailed topics as illustrated in FIG. 27(B) may be displayed or presented via voice when a user requests to acquire detailed topics by speech or by inputting a command after the index information is notified via voice to the user.

As described above, in the present embodiment, information to be presented is determined according to the cognitive load of a person who is browsing certain information after acquisition of the information. For example, media such as detailed topics, an image and/or vide are presented to a user carrying a low cognitive load and capable of browsing, while speech information or abstract information is provided to a user carrying a high cognitive load. This enables information presentation to a user according to the degree of user's cognitive load.

It should be noted that the contents of the information to be presented is not limited to the above, and information may be presented taking account of user's cognitive load.

It is possible to provide cognitive load judgment means that judges the degree of a cognitive load, for example, instead of plural information presentation sections according to the degree of user's cognitive load, so that the content of the information to be presented through a single information presentation section is altered according to the degree of the judged cognitive load. For example, the state of the automobile is detected and if it is judged that the cognitive load is low when the automobile is in a parking state, detailed topics, and image and/or video are presented. While, when it is judged that the cognitive load is high when the automobile is in a running state, information may be presented via voice or abstract information may be presented.

It should be noted that the car navigation system is referred to as equipment for providing information to a user in each of the above embodiments, but information equipment applicable to the present invention is not limited to the car navigation system. For example, information terminals carried daily by users, such as mobile phones, PDAs can realize the aforementioned embodiments only if they are capable of sensing position information. An automobile boarding a car navigation system is employed as the mobile body in each of the above embodiments, but the present invention can be realized in other cases, such as the case where a human being as a mobile body carrying information equipment travels on foot, by train, and the like.

Further, the illustrated constitutions are provided within the car navigation system fully in the respective embodiments. But the present invention is not limited thereto and the information equipment carried by a user only needs to have at least the position detection section 101 and the information presentation section 111 (or first and second information presentation sections 2501, 2502). All or a part of the other functions may be provided in an external server connected to a network. Specifically, such a constitution is possible in which position information detected by the position detection section 101 is sent to and accumulated in the server; and upon prediction in the server, information relating to the predicted place is sent to the car navigation system. Such a constitution is especially effective in the case where the information equipment is a mobile phone or a PDA.

Moreover, the information acquisition method in the present invention can be realized by allowing a computer installed in at least one of information equipment and a server to execute a program.

Furthermore, a VICS (Vehicle Information and Communication System) or a broadcast wave may be utilized for information acquisition, rather than the network.

The information received in the information receiving section 801 is accumulated in the received information DB 802 and information relating to a predicted destination is extracted therefrom and is presented to a user in each of the embodiments. Besides, the following constitution can be considered. Namely, an information sending section for sending information to a network is provided so that: the information sending section sends, upon prediction of a travel destination by the prediction section 108, information indicating the predicted place to the server; the server extracts information relating to the predicted place from the accumulated information and sends it to the car navigation system; and the information receiving section 801 presents the received information. With this constitution, only necessary information is sent and received via the network, which is effective in the case where there is time from prediction to information presentation. Further, another constitution is possible in which information on a wide range including the current position and a predicted travel destination is acquired in advance and accumulated in the received information DB 802, and necessary information is extracted and presented upon determination of the predicted travel destination.

In each of the embodiments, the transition state information generation section 106 generates transition state information from a travel history, and the condition determination 107 and the prediction section 108 operate using the thus generated transition state information. However, a constitution without providing the transition state information generation section 106 can be thought. In this case, the condition determination section 107 and the prediction section 108 perform determination of a condition for retrieval and prediction of a travel destination, respectively, directly from the information on the travel history as indicated in FIG. 3.

In each of the embodiments, various timing can be considered as respective timing of operating the threshold value calculation section 105, the transition state information generation section 106, the condition determination section 107, and the prediction section 108. For example, all the elements may operate every time when passing through a node. Or, they may operate at timing of: start of a travel in time T; end of a travel in time T−1; completion of prediction of a starting point of the travel in the time T in the middle of the travel in the time T−1, as mentioned in the fifth embodiment; and the like. Alternatively, it is possible that: the threshold value calculation section 105 and the transition state information generation section 106 operate upon end of the travel in the time T−1 to generate transition state information in advance; the condition determination section 107 and the prediction section 108 operate at travel start at time T or every time when traveling through a node to perform determination of a condition for retrieval and route prediction based on the generated transition state information. Furthermore, it is possible that: the elements up to the condition determination 107 operate at travel end at time T−1 to determine transition state information and a condition for retrieval; and only the prediction section 108 operates at travel start at time T or every time when traveling through a node. The present invention does not limit any timing.

Referring to the timing of information presentation to a user in each of the embodiments, the information may be presented at travel start; at time when the value of a prediction probability exceeds a predetermined threshold value while prediction is performed every time when passing through a node starting from travel start; or at time when user indicates intention of information acquisition. No limit is imposed.

Each of the embodiments is described referring to a car navigation system as an object, and a route from a starting point (position where the engine starts) to an arrival point (position where the engine stops) is used as a segment of data of a travel history, but the present invention is not limited thereto. For example, various segments are considered in mobile terminals such as mobile phones, PDAs, and the like, such as a segment from power-on to power-off, a segment from departure from home to return to home, a segment of the same date, a segment from a place registered as a landmark to a place registered as a landmark, and the like.

In each of the embodiments, the transition state information not necessarily needs to reflect all past histories as in FIG. 5, and only needs to indicate the transition state thereafter (route and destination thereafter), the frequency thereof, and the like, among the past histories that include at least the current route information. For example, when the current route is "L6 to C9," the transition state information is composed of a partial tree structure including at least this route in the tree structure shown in FIG. 5. In addition, it may be expressed by a table or a matrix, instead of such a tree structure.

INDUSTRIAL APPLICABILITY

The present invention is applicable to a technology for performing information presentation to users with the use of information equipment such as a car navigation system, a mobile phone, a PDA, and the like, and attains acquisition of appropriate information by highly accurate prediction of user's travel destination, which is useful.

The invention claimed is:

1. An information acquisition method for acquiring information relating to a travel destination of a mobile body, comprising:

a first step of accumulating, as a travel history in a form of inter-node transition, a travel route obtained from a history of position information of the mobile body, at least one of nodes indicating a landmark, an area, or an intersection;

a second step of determining, as a condition for retrieval, a kind and a category of a key at retrieval on the travel history; and a third step of performing retrieval on the travel history under the condition for retrieval to predict one or more travel destinations or travel routes where the mobile body will advance, based on a result of the retrieval, wherein information relating to a predicted travel destination or a predicted travel route is acquired.

2. The information acquisition method of claim 1, wherein the kind of the key in the second step includes at least one of time, date, weather, and a position and a travel route of the mobile body.

3. The information acquisition method of claim 1, wherein in the second step, determination of the condition for retrieval is performed based on statistical processing.

4. The information acquisition method of claim 3, wherein the second step includes:

a step (a) of selecting a candidate of the condition for retrieval; and a step (b) of calculating entropy for each prediction probability value of one or more travel destinations where the mobile body might advance under a selected condition candidate, and wherein the steps (a) and (b) are repeated alternately, and the condition for retrieval is specified from the selected candidates based on values of the calculated entropies.

5. The information acquisition method of claim 1, wherein in the third step, each prediction probability of one or more travel destinations where the mobile body might advance is obtained, and prediction is performed based on each obtained prediction probability.

6. The information acquisition method of claim 1, further comprising the step of:

predicting a new travel destination or a new travel route where the mobile body will advance before the mobile body starts a travel from the travel destination or the travel route predicted in the third step.

7. An information presenting method for presenting information relating to a travel destination of a mobile body, comprising:

a first step of acquiring relating information on a travel destination predicted according to the information acquisition method of claim 1; and a second step of determining information to be presented on the travel destination based on the information acquired in the first step, wherein the determined information to be presented is presented.

8. The information presenting method of claim 7, wherein the second step includes the steps of:

referencing information indicating a correspondence among positions, names, and genre names to which the positions belong; and determining at least one of the name and the genre name of the travel determination as information to be presented.

9. The information presenting method of claim 7, wherein the first step includes the step of calculating an estimated necessary time for transferring from a current position of the mobile body to the predicted travel destination as relating information by referencing the travel history.

10. The information presenting method of claim 9, wherein in the first step, road/traffic information up to the travel destination is acquired via the network, and in the second step, an actual necessary time up to the travel destination with consideration of traffic circumstances is estimated by referencing the estimated necessary time and the road/traffic information.

11. An information acquisition method for acquiring information relating to a travel destination of a mobile body, comprising:

a first step of accumulating, as a travel history in a form of inter-node transition, a travel route obtained from a history of position information of the mobile body;

a second step of determining, as a condition for retrieval, a kind and a category of a key at retrieval on the travel history; and a third step of performing retrieval on the travel history under the condition for retrieval to predict one or more travel destinations or travel routes where the mobile body will advance, based on a result of the retrieval, wherein information relating to a predicted travel destination or a predicted travel route is acquired, wherein an intersection through which the mobile body has traveled in two or more directions among intersections in a travel route is set as a node.

12. An information acquisition method for acquiring information relating to a travel destination of a mobile body, comprising:

a first step of accumulating, as a travel history in a form of segment of travel start and travel end, a travel route obtained from a history of position information of the mobile body;

a second step of determining, as a condition for retrieval, a kind and a category of a key at retrieval on the travel history; and a third step of performing retrieval on the travel history under the condition for retrieval to predict one or more travel destinations or travel routes where the mobile body will advance, based on a result of the retrieval, wherein information relating to a predicted travel destination or a predicted travel route is acquired.

13. A program for allowing a computer that at least one of information equipment and a server includes to execute the information acquisition method of any one of claims 1, 11, or 12.

14. An information presenting method for presenting information relating to a travel destination of a mobile body, comprising:

a first step of accumulating, as a travel history, a travel route obtained from a history of position information of the mobile body;

a second step of determining, as a condition for retrieval, a kind and a category of a key at retrieval on the travel history;

a third step of performing retrieval on the travel history under the condition for retrieval to predict one or more travel destinations or travel routes where the mobile body will advance and to obtain a prediction probability of the predicted travel destination, based on a result of the retrieval;

a fourth step of acquiring information relating to a predicted travel destination; and a fifth step of determining information to be presented on the travel destination based on the information acquired in the fourth step, wherein the determined information to be presented is presented, wherein the fifth step includes the steps of:

referencing information indicating a correspondence among positions, names, and genre names to which the positions belong; and determining, as information to be presented, the name of the predicted destination when the prediction probability of the predicted travel destination exceeds a predetermined value, and otherwise determining the genre name thereof as information to be presented.

15. An information presenting method for presenting information relating to a travel destination of a mobile body, comprising:

a first step of accumulating, as a travel history, a travel route obtained from a history of position information of the mobile body;

a second step of determining, as a condition for retrieval, a kind and a category of a key at retrieval on the travel history;

a third step of performing retrieval on the travel history under the condition for retrieval to predict one or more travel destinations or travel routes where the mobile body will advance, based on a result of the retrieval;

a fourth step of acquiring information relating to a predicted travel destination; and a fifth step of determining information to be presented on the travel destination based on the information acquired in the fourth step, taking account of a cognitive load of a user who receives information presentation, wherein the determined information to be presented is presented.

16. An information acquisition system comprising:

a history accumulation section that accumulates, as a travel history in a form of inter-node transition, a travel route obtained from a history of position information of a mobile body, at least one of nodes indicating a landmark, an area, or an intersection;

a condition determination section that determines, as a condition for retrieval, a kind and a category of a key at retrieval on the travel history accumulated in the history accumulation section; and a prediction section that performs retrieval on the travel history under the condition for retrieval to predict one or more travel destinations for which the mobile body will advance based on a result of the retrieval, wherein information relating to the travel destination predicted by the prediction section is acquired.

17. An information presenting method for presenting information relating to a travel destination of a mobile body, comprising:

a first step of accumulating, as a travel history, a travel route obtained from a history of position information of the mobile body;

a second step of determining, as a condition for retrieval, a kind and a category of a key at retrieval on the travel history;

a third step of performing retrieval on the travel history under the condition for retrieval to predict one or more travel destinations or travel routes where the mobile body will advance and to obtain a prediction probability of the predicted travel destination, based on a result of the retrieval;

a fourth step of acquiring information relating to a predicted travel destination; and a fifth step of determining information to be presented on the travel destination based on the information acquired in the fourth step, wherein the determined information to be presented is presented, wherein the fifth step includes the steps of:

referencing information indicating a correspondence among positions, names, and genre names to which the positions belong; and setting level of detailedness about the information to be presented in accordance with the prediction probability of the predicted travel destination obtained in the third step.

18. An information acquisition system comprising:

a history accumulation section that accumulates, as a travel history in a form of inter-node transition, a travel route obtained from a history of position information of a mobile body;

a condition determination section that determines, as a condition for retrieval, a kind and a category of a key at retrieval on the travel history accumulated in the history accumulation section; and a prediction section that performs retrieval on the travel history under the condition for retrieval to predict one or more travel destinations for which the mobile body will advance based on a result of the retrieval, wherein information relating to the travel destination predicted by the prediction section is acquired, wherein the information acquisition system further comprises means for setting an intersection through which the mobile body has traveled in two or more directions among intersections in a travel route as a node.

19. An information acquisition system comprising:

a history accumulation section that accumulates, as a travel history in a form of segment of travel start and travel end, a travel route obtained from a history of position information of a mobile body;

a condition determination section that determines, as a condition for retrieval, a kind and a category of a key at retrieval on the travel history accumulated in the history accumulation section; and a prediction section that performs retrieval on the travel history under the condition for retrieval to predict one or more travel destinations for which the mobile body will advance based on a result of the retrieval, wherein information relating to the travel destination predicted by the prediction section is acquired.

* * * * *

UNITED STATES PATENT AND TRADEMARK OFFICE
CERTIFICATE OF CORRECTION

PATENT NO. : 7,487,918 B2 Page 1 of 1
APPLICATION NO. : 10/529609
DATED : February 10, 2009
INVENTOR(S) : Kudo et al.

It is certified that error appears in the above-identified patent and that said Letters Patent is hereby corrected as shown below:

On the title page,

[*] Notice: Subject to any disclaimer, the term of this patent is extended or adjusted under 35 USC 154(b) by (575) days Delete the phrase "by 575 days" and insert -- by 563 days --

Signed and Sealed this

Fifteenth Day of September, 2009

David J. Kappos
*Director of the United States Patent and Trademark Office*